(12) United States Patent
Jing et al.

(10) Patent No.: US 8,116,336 B2
(45) Date of Patent: Feb. 14, 2012

(54) DISTRIBUTED IP ADDRESS ASSIGNMENT PROTOCOL FOR A MULTI-HOP WIRELESS HOME MESH NETWORK WITH COLLISION DETECTION

(75) Inventors: Xiangpeng Jing, San Diego, CA (US);
Aixin Liu, San Diego, CA (US);
Abhishek Patil, San Diego, CA (US);
Djung N. Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 473 days.

(21) Appl. No.: 12/360,824

(22) Filed: Jan. 27, 2009

(65) Prior Publication Data

US 2010/0189029 A1    Jul. 29, 2010

(51) Int. Cl.
*H04L 12/42* (2006.01)
(52) U.S. Cl. ........ 370/447; 370/312; 370/432; 370/445; 370/462
(58) Field of Classification Search .................. None
See application file for complete search history.

(56) References Cited

U.S. PATENT DOCUMENTS

| | | | |
|---|---|---|---|
| 6,581,166 B1 | 6/2003 | Hirst et al. | |
| 6,842,460 B1 | 1/2005 | Olkkonen et al. | |
| 6,879,574 B2 | 4/2005 | Naghian et al. | |
| 7,069,483 B2 | 6/2006 | Gillies et al. | |
| 7,092,715 B2 * | 8/2006 | Korpela et al. | 455/446 |
| 7,184,767 B2 | 2/2007 | Gandolfo | |
| 7,366,113 B1 | 4/2008 | Chandra et al. | |
| 7,403,492 B2 | 7/2008 | Zeng et al. | |
| 7,408,911 B2 | 8/2008 | Joshi | |
| 7,443,809 B2 * | 10/2008 | Bajic | 370/254 |

(Continued)

FOREIGN PATENT DOCUMENTS

EP    1912147    4/2008

(Continued)

OTHER PUBLICATIONS

Johnson, et al. "DSR: The Dynamic Source Routing Protocol for Multi-Hop Wireless Ad Hoc Networks," in *Ad Hoc Networking*, Charles Perkins, ed., Chapter 5, pp. 139-172, Addison-Wesley, 2001.

(Continued)

*Primary Examiner* — Donald Mills
(74) *Attorney, Agent, or Firm* — Blakely, Sokoloff, Taylor & Zafman LLP

(57) ABSTRACT

An apparatus and method for a multi-tier wireless home mesh network is described. The method may include formation of a wireless home networking environment comprising a collection of nodes that operate as a decentralized, wireless network with multiple sub-networks or tiers that are responsible for different functions within the network. Each node of the multi-tier network is configured to forward data to other nodes and is assigned to a particular tier based on the node's performance capabilities. The method may include the automatic establishment of a unique Internet protocol (IP) address within a multi-hop wireless home mesh network with the ability to do automatic collision detection and correction. Once established as either a mobile node or a stationary node of the wireless home mesh network, a new node (the home electronics device) may wirelessly communicate with one or more existing nodes of the wireless home mesh network. Other embodiments are described and claimed.

23 Claims, 13 Drawing Sheets

U.S. PATENT DOCUMENTS

| | | | |
|---|---|---|---|
| 7,505,751 B1* | 3/2009 | Backes | 455/332 |
| 7,554,998 B2 | 6/2009 | Simonsson et al. | |
| 7,586,888 B2* | 9/2009 | Wang | 370/338 |
| 7,623,501 B2* | 11/2009 | Rangarajan et al. | 370/338 |
| 7,822,064 B2* | 10/2010 | Thubert et al. | 370/468 |
| 7,961,674 B2 | 6/2011 | Jing et al. | |
| 2004/0103295 A1 | 5/2004 | Gustafsson | |
| 2004/0174904 A1* | 9/2004 | Kim et al. | 370/475 |
| 2004/0233855 A1 | 11/2004 | Gutierrez et al. | |
| 2004/0235468 A1 | 11/2004 | Luebke et al. | |
| 2005/0201393 A1 | 9/2005 | Hatayama et al. | |
| 2006/0013210 A1 | 1/2006 | Bordogna et al. | |
| 2006/0161778 A1 | 7/2006 | Stirbu et al. | |
| 2007/0081543 A1 | 4/2007 | Brenes et al. | |
| 2007/0104215 A1* | 5/2007 | Wang et al. | 370/458 |
| 2007/0127503 A1 | 6/2007 | Zhao | |
| 2007/0147241 A1 | 6/2007 | Wang et al. | |
| 2007/0178884 A1 | 8/2007 | Donovan et al. | |
| 2007/0195702 A1 | 8/2007 | Yuen et al. | |
| 2007/0200914 A1* | 8/2007 | DuMas et al. | 348/14.01 |
| 2007/0254677 A1 | 11/2007 | Venkitaraman et al. | |
| 2008/0037442 A1 | 2/2008 | Bill | |
| 2008/0039130 A1 | 2/2008 | Acampora | |
| 2008/0112363 A1 | 5/2008 | Rahman et al. | |
| 2008/0112371 A1 | 5/2008 | Joshi et al. | |
| 2009/0147702 A1* | 6/2009 | Buddhikot et al. | 370/255 |
| 2009/0213824 A1 | 8/2009 | Chen | |
| 2009/0303902 A1 | 12/2009 | Liu et al. | |
| 2010/0080200 A1 | 4/2010 | Stewart | |
| 2010/0083303 A1 | 4/2010 | Redei et al. | |
| 2010/0188971 A1 | 7/2010 | Chiang | |
| 2010/0189011 A1* | 7/2010 | Jing et al. | 370/254 |
| 2011/0021150 A1 | 1/2011 | Lin | |

FOREIGN PATENT DOCUMENTS

| | | |
|---|---|---|
| KR | 100499122 | 7/2005 |
| WO | WO 2004/017552 | 2/2004 |
| WO | WO 2005/109754 | 2/2005 |
| WO | WO2006/098723 | 9/2006 |
| WO | WO-2006098723 | 9/2006 |
| WO | WO 2008/002718 | 1/2008 |

OTHER PUBLICATIONS

Peng, et al. "A Wireless MAC Protocol with Collision Detection," IEEE Transactions on Mobile Computing, vol. 6, No. 12, Dec. 2007, pp. 1357-1369.

"United States Patent and Trademark Office - Non-Final Office Action Dated Aug. 4 2010", U.S. Appl. No. 12/402 413.

International Search Report and Written Opinion of the International Searching Authority Dated Aug. 5, 2010, International Application No. PCT/US2010/021082.

United States Patent and Trademark Office—Non-Final Office Action Dated Aug. 19, 2010, U.S. Appl. No. 12/360,821.

United States Patent and Trademark Office—Non-Final Office Action Dated Jan. 20, 2011, U.S. Appl. No. 12/791,386.

"United States Patent and Trademark Office—Final Office Action Dated Jun. 24, 2011", U.S. Appl. No. 12/791,386.

Auto IP Collision Detection and Resolution for Multi-Hop Sony Mesh Network with Link Failures (Sony Electronics Proprietary) 1 page.

Auto IP Slide Show (Sony Electronics Proprietary) 5 pages.

PCT/US2010/021082 Notification Concerning Transmittal of International Preliminary Report on Patentability (Chapter 1 of the Patent Cooperation Treaty); Date of mailing Aug. 11, 2011.

International Search Report and Written Opinion of the International Searching Authority Dated Oct. 12, 2010, International Application No. PCT/US2010/023242.

International Search Report of the International Searching Authority Dated Oct. 12, 2010, International Application No. PCT/US2010/023424.

International Search Report and Written Opinion of the International Searching Authority Dated Aug. 23, 2010, International Application No. PCT/US2010/021685.

International Search Report of the International Searching Authority Dated Aug. 23, 2010, International Application No. PCT/US2010/021685.

United States Patent and Trademark Office—Non-Final Office Action Dated Oct. 4, 2011, U.S. Appl. No. 12/367,184.

Benveniste, Mathilde, "Express Forwarding: A Distributed QoS MAC Protocol for Wireless Mesh", MESH 2008, Cap Esteral, France.

Ellison, Carl M., : "Home Security" Intel Technology Journal, Nov. 12, 2002. vol. 6, issue 4, pp. 37-48, ISSN 1535-766X. See pp. 41-42, 46-47.

Hong, et al., "A Base-station Centric Data Gathering Routing Protcol in Sensor Networks Useful in Home Automation Applications," IEEE Transactions on Consumer Electronics, vol. 53, Issue 3, Aug. 2007, pp. 945-951 (Abstract only, 1 page).

Hubaux, Jean-Pierre, *Peer-to-Per security in Wireless Ad Hoc Networks* pp. 1-45, EPEL—Eroffnungskolloquium des Sonderforschungsbereich 627 Nexus, htt://LCAWWW.epfl.ch/hubaux/Talks/Stuttgart.ppt.

Johnson, et al., "DSR: The Dynamic Source Routing Protocol for Multi-Hop Wireless Ad Hoc Networks", *Ad Hoc Networking*, Charles Perkins, ed., Chapter 5, pp. 139-172, Addison-Wesley, 2001.

Naouel, Ben S., et al., *"Secure Wireless Mesh Networks"*, Laboratory of Computer Communications and Applications (LCA), Apr. 6, 2006, p. 1-10 (4), EPFL—Lausanne, Switzerland, http://www.ele.uri.edu/next/readinglist/Securing_Wireless_Mesh_Networks.pdf.

Peng, et al., "A Wireless MAC Protocol with Collision Detection", IEEE Transactions on Mobile Computing, vol. 6, No. 12, Dec. 2007, pp. 137-1369.

Shai, Halevi, et al., "Public-Key Cryptography and Password Protocols." ACM Transactions on Information and System Security, Aug. 1999, vol. 2, No. 3, pp. 230-268, See figs. 1-2, and pp. 239-242.

Souryal, Michael R., et al., "Real-Time Deployment of Multihop Relays for Range Extension",*Wireless Communication Techologies Group, National Institute of Standards and Technology*, Gaithersburg, MD, US, 2007 copyright Association for Computing Machinery, pp. 85-98.

Tang, Helen, et al., *"Strong Authentication for Tactical Mobile Ad Hoc Networks"*, Jul. 2007, pp. 1-53, Defence R&D Cananda—Ottawa: Technical Memorandum DRDC Ottawa TM 2007-146.

United States Patent and Trademark Office—Office Action Dated Oct. 4, 2011, U.S. Appl. No. 12/367,184.

* cited by examiner

DISTRIBUTED IP ADDRESS ASSIGNMENT PROTOCOL FOR A MULTI-HOP WIRELESS HOME MESH NETWORK WITH COLLISION DETECTION

FIELD

The invention relates generally to the field of wireless device connectivity. More particularly, one or more of the embodiments of the invention relate to a method and apparatus for distributed IP address assignment protocol for a multi-hop wireless home mesh network with collision detection.

BACKGROUND

A wireless network can provide a flexible data communication system that can either replace or extend a wired network. Using radio frequency (RF) technology, wireless networks transmit and receive data over the air through walls, ceilings and even cement structures without wired cabling. For example, a wireless local area network (WLAN) provides all the features and benefits of traditional LAN technology, such as Ethernet and Token Ring, but without the limitations of being tethered together by a cable. This provides greater freedom and increased flexibility.

Currently, a wireless network operating in accordance with the Institute of Electrical and Electronic Engineers (IEEE) 802.11 Standard (e.g., IEEE Std. 802.11a/b/g/n) may be configured in one of two operating modes: infrastructure mode and ad hoc mode. As of today, most installed wireless networks are configured and operate in infrastructure mode where one or more access points (APs) are configured as interfaces for a wired distribution network (e.g., Ethernet). In infrastructure mode, mobile devices with wireless connectivity (e.g., laptop computer with a radio network interface card "NIC") are able to establish communications and associate with the AP, and thus, the users of these devices are able to access content within servers connected to the wired network.

As an optional feature, however, the IEEE 802.11 Standard specifies ad hoc mode, which allows the radio NIC within each wireless device to operate in an independent basic service set (IBSS) network configuration. Hence, the wireless devices perform peer-to-peer communications with each other instead of utilizing the AP for supporting such wireless communications. The ad hoc mode also allows users to spontaneously form a wireless LAN. For example, a group of employees with laptops implemented with IEEE 802.11 wireless chipsets may gather at a coffee house and form a small WLAN by switching their NICs to ad hoc mode. As a result, the employees could share presentation charts and spreadsheets without the need for cabling or an AP.

One type of ad hoc network is referred to as a mesh network, which allows for continuous connections and reconfiguration around broken or blocked paths by "hopping" from device to another device until the destination is reached. Mesh networks differ from other networks in that the devices can all connect to each other via multiple hops without an infrastructure (e.g., an AP), and these devices can be mobile or stationary. Related to mesh networks, mobile ad-hoc networks (MANETs) are self-configuring networks of mobile routers, where the routers are free to relocate.

One of the primary advantages of mesh networks (and MANETs) is their ability to extend the range of the wireless network. For example, a user on one side of the building can send a packet destined to another user on the far side of the facility, well beyond the point-to-point range of IEEE 802.11-compliant AP, by having the radio signal hop from one mobile device to mobile device until the radio signal gets to its targeted destination. This can extend the range of the WLAN from hundreds of feet to miles, depending on the concentration of wireless users.

With recent technology advances in integrated circuits, and breakthroughs in multiple input and multiple output (MIMO) systems, wireless digital communications have entered a new era that allows faster speed for wireless networking applications. Mobile devices such as smart phones, music/movie players, personal digital assistants, gaming devices and the like, are creating a demand for new wireless communication and networking technologies to allow seamless connection of wireless mobile devices within a home network that not only support high-bandwidth demanding applications such as high-definition (HD) videos, but also relies on manufacturer compatibility between the wireless devices to mitigate interloper and rogue network activity.

SUMMARY

One disclosed feature of the embodiments provides a method and apparatus for a distributed IP address assignment protocol for a multi-hop wireless home mesh network with collision detection. A multi-hop wireless home mesh network is described that improves existing home network performance for better range/rate and interconnection with outdoor wireless networks. Home (consumer) electronics devices may be classified according to a multi-tier system, comprising a collection of nodes that operate as a decentralized, wireless home mesh network with multiple ($N \geq 1$) sub-networks (hereinafter referred to as "tiers") that are responsible for different functions within the network. Each node of the multi-hop wireless network is assigned to a particular tier based on the node's performance capabilities, and is configured to forward data to other nodes.

In one embodiment, a hierarchical architecture is described where different functions can be implemented for stationary and mobile nodes in the network. In one embodiment, using the various available home electronic devices, these devices may be organized as nodes of a wireless home mesh network. For example, a first tier of the network may resemble a traditional Internet connection (via a cable/DSL connection, or 3G/WiMax outdoor mesh). The node directly connected to the Internet may be referred to as a gateway node and there may be multiple gateway nodes in a home network. A second tier of the network represents the backhaul of the network that interconnects various stationary (fixed-location) consumer electronics (CE) devices (e.g., flat-panel TVs, Playstations, or desktop computers) that are usually stationary and electrically coupled to a power supply (non-power constrained). A third tier of the network may include links between a device belonging to the second tier of the network and mobile CE devices.

In a further embodiment, the method may include the automatic establishment of a unique Internet protocol (IP) address within a detected multi-hop wireless home mesh network. Once established as either a mobile node or a stationary node of the wireless home mesh network, a new node (the home electronics device) may wirelessly communicate with one or more existing nodes of the multi-hop wireless home mesh network.

BRIEF DESCRIPTION OF THE DRAWINGS

The present invention is illustrated by way of example, and not by way of limitation, in the figures of the accompanying drawings and in which.

DETAILED DESCRIPTION

In the following description, for the purposes of explanation, numerous specific details are set forth in order to provide a thorough understanding of the present invention. It will be apparent; however, to one skilled in the art that present invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. In other instances, well-known structures and devices are shown in block diagram form in order to avoid obscuring the details of the disclosed features of various described embodiments.

System Architecture

In the following description, certain terminology is used to describe certain features of the invention. For instance, the term "wireless node" is generally defined as a device with data processing and wireless communication capabilities. The term "logic" is generally defined as hardware and/or software configured to perform one or more functions. One example of a certain type of logic is a wireless chipset, being one or more integrated circuits, operating to request access to a wireless network and/or authenticate a wireless node before granting the node access to the wireless network. "Software" is generally describes as a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., USB drive, optical disc, digital tape), or the like.

The term "message" represents information configured for transmission over a network. One type of message is a frame that is generally defined as a group of bits of information collectively operating as a single data unit. The term "content" includes video, audio, images, data files, or any combination thereof.

Figure 1:
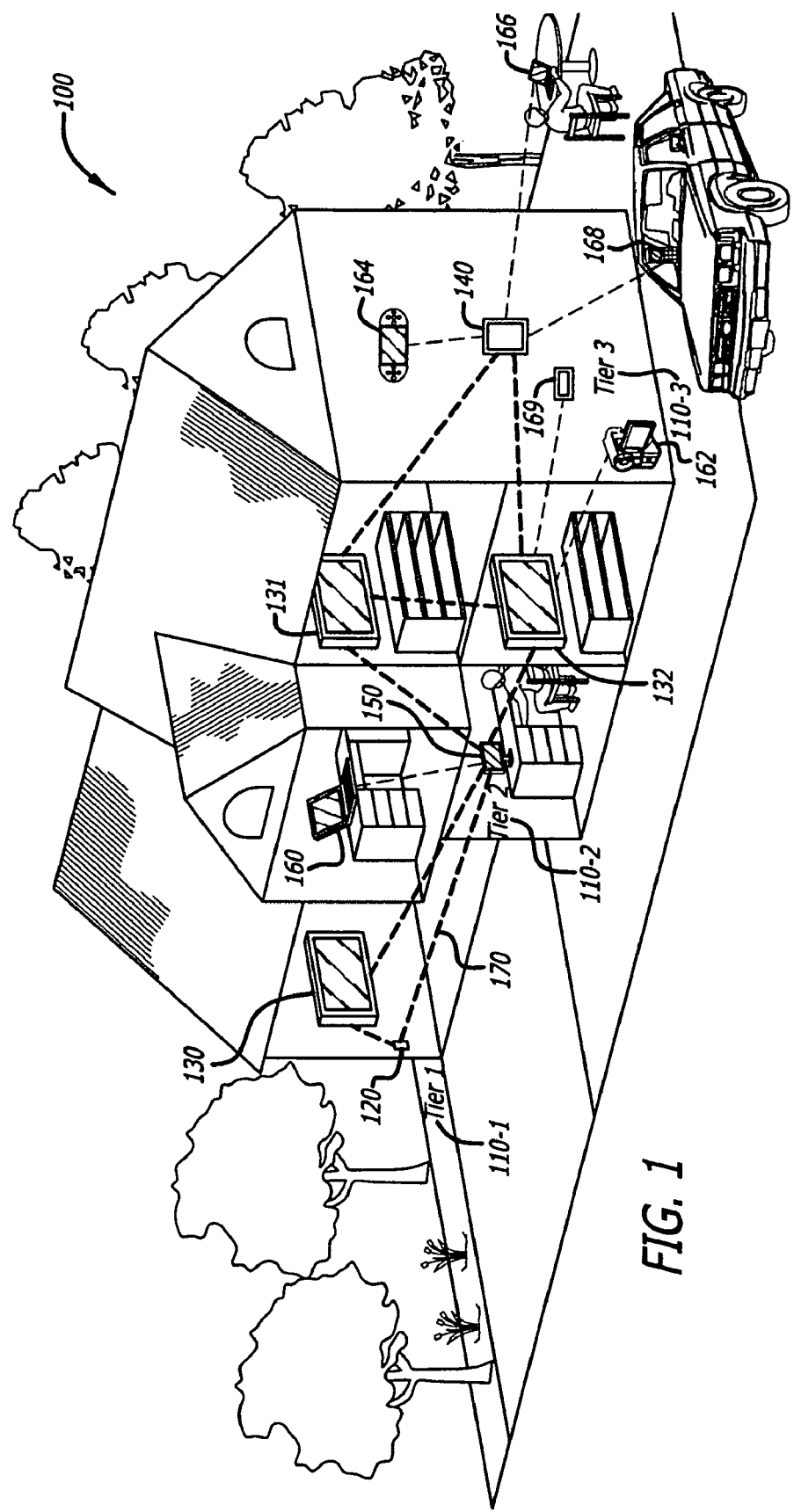
FIG. 1 is a block diagram illustrating a three-tier wireless ad hoc home network, according to one embodiment.

Referring to FIG. 1, an exemplary embodiment of a multi-tier wireless home mesh network 100 is described. Multi-tier wireless home mesh network 100 (hereinafter referred to as "home network" or "WHMN" 100) comprises a collection of nodes that operate as a decentralized, wireless home mesh network with multiple ($N \geq 1$) sub-networks $110_1$-$110_N$ (hereinafter singularly referred to as "tiers") that are responsible for different functions within home network 100. Hence, mostly every node of home network 100 is configured to forward data to other nodes and is assigned to a different tier based on its performance capabilities and power constraints. The assignment of a node to a tier is a decision based on performance capabilities of the node, whereas routing decisions are made by the nodes based on the network connectivity and the ability to forward data by that particular node.

For instance, one embodiment of home network 100 features a hierarchical architecture comprising three (3) tiers that are assigned based on the capabilities of the node. A first tier ("tier 1") $110_1$ is responsible for establishing and controlling access to an external network such as the Internet. For example, first tier $110_1$ may resemble a traditional Internet connection via a cable or direct subscriber line (DSL) connection or 3G/WiMax/Outdoor mesh. As illustrated, first tier $110_1$ comprises a first node 120, which is commonly referred to as a "gateway node." Gateway node 120 may include, but is not limited or restricted to a cable or DSL modem, a wireless router or bridge, and the like. Although not shown, multiple gateway nodes may be present within home network 100 in order to provide multiple communication paths to external network(s).

A second tier ("tier 2") $110_2$ of home network 100 may represent a wireless network backhaul that interconnects various stationary (fixed-location) wireless nodes such as stationary (fixed-location) electronics devices adapted for communicating over a wireless communication medium such as, for example, radio frequency (RF) waves. As described herein, an "electronics device" may be stationary or mobile. A "stationary electronics device" includes, but is not limited or restricted to: a flat-panel television (130, 131, and 132), a gaming console (140), desktop computer (150), or any other device that is usually stationary and is electrically coupled to an AC power outlet. Hence, stationary wireless nodes are not subject to power constraints that are usually present in mobile wireless nodes where power usage is minimized to extend battery life between recharges.

Referring still to FIG. 1, a third tier ("tier 3") $110_3$ of home network 100 may include links between a wireless node belonging to second tier $110_2$ and one or more mobile nodes (160-169). A "mobile electronics device" or "mobile wireless node" may include any battery powered electronics device with wireless connectivity including, but not limited to, a laptop computer, handheld device (e.g., personal digital assistant, ultra mobile device, cellular phone, portable media player, wireless camera, remote control, etc.) or the like non-stationary consumer electronics devices. Since mobile wireless nodes normally have resource constraints (e.g., limited power supplies, limited processing speeds, limited memory, etc.), third tier $110_3$ may provide reduced network services. In one embodiment, mobile wireless nodes of home network 100 may act as a slave or child connecting directly to a tier 2 node, which may further limit their functionality within home network 100.

Below, Table 1 summarizes a multi-tier, wireless home mesh network architecture, categorization by potential network characteristics, tier node descriptions and traffic type that is prevalent over home network 100.

TABLE 1 multi-tier wireless home mesh network scenario

| | | Characteristics | Examples |
|---|---|---|---|
| Network | Dimension | ~50 × 60 sq ft; 1-2 stories or high-rising building | House Apartment building Business |
| | Node Number | Tier 2 - 3~10; Tier 3 - 5~20 | 2 TVs, 1 desktop computer, 1 PS3; 2 laptops, 4 mobile phones, 4 media players, ... |
| | Distribution | Indoor, 3D, Non-LOS, link distance 15~60 ft | Uniformly distributed Tier-2 nodes, clustered Tier 3 |
| Node Type (per Tier Network) | Tier 1 | Usually one or two Tier 1 nodes | Cable/DSL modem, WiMax/3G, Outdoor Mesh |
| | Tier 2 | Fixed location, power-sufficient (TX power 100 mW-1 W) | TV, desktop computer, gaming console (e.g. PS3), etc. |
| | Tier 3 | Mobile, power-limited (TX power 1-100 mW) | Laptop, mobile phone, portable media player, wireless camera, remote |
| Traffic | HD video streaming | ~30 Mbps compressed | 1080p/i, 720p/i, 480p/i quality HD videos |
| | SD Video/ Audio streaming | ~100k-1 Mbps video, 32k-256 kbps audio | Internet video clip (e.g. YouTube), webcam output, mp3 audio, voice |
| | Data | Bursty transmission, ~20 Mbps for certain user satisfaction | http type data (web browsing) |

As indicated by Table 1, home network 100 is distinct from conventional mesh-network solutions because home network 100 is directed to consumer electronics (CE) devices and video-centric applications. Based on the traffic indicated in Table 1, which may include high-definition (HD) video, audio clips and video clips, as well as user data, wireless NICs may be incorporated within some of the stationary nodes of the home network 100. For example, by multiplexing one flow of compressed HD video, four Internet video sessions plus four audio/video sessions and some intermittent http data traffic, the load on the backhaul link 170 is approximately 60 megabits per second for TCP/UDP type traffic, which may require at least 100 megabits per second of raw radio support considering media access control (MAC) layer efficiency. According to this example, the tier 2 nodes might require an 802.11n type radio (e.g., at 5 GHz band) to meet such a bandwidth requirement.

Figure 2:
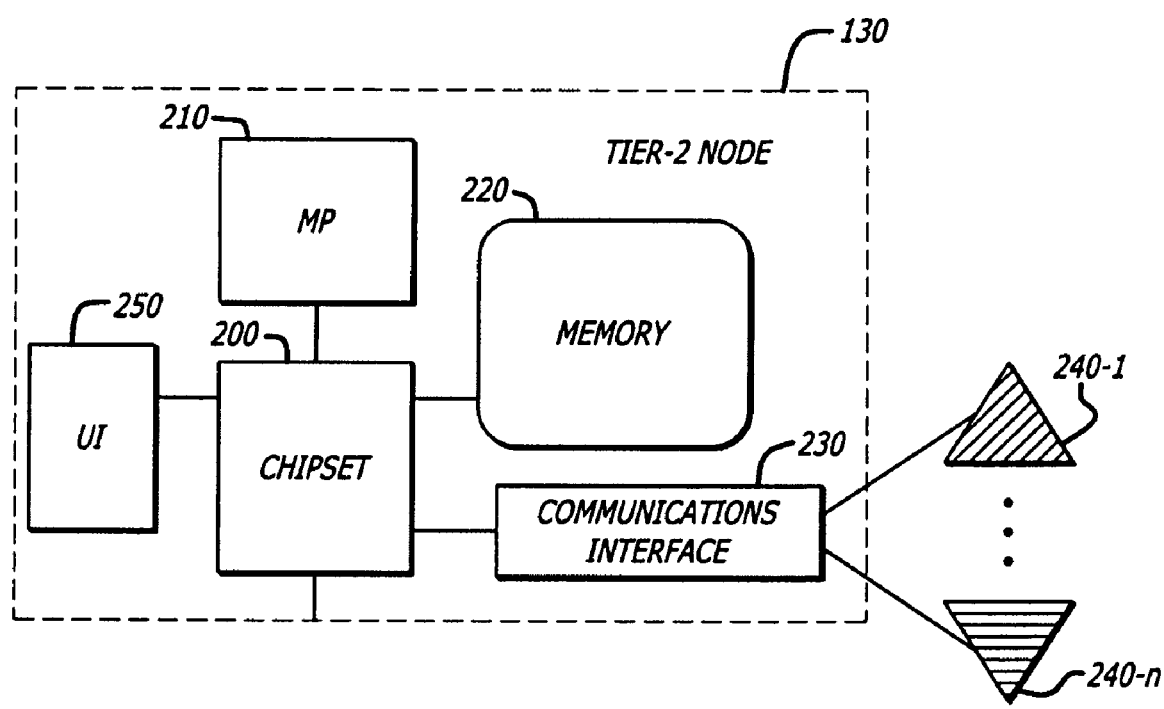
FIG. 2 is a block diagram illustrating a tier-2 node within a wireless ad hoc home network, according to one embodiment.

Referring now to FIG. 2, an exemplary embodiment of tier 2 node 130 is shown. Herein, tier 2 node 130 comprises an embedded wireless network chipset 200 that includes one or more processors 210, memory 220, a communications interface 230, and a user interface (UI) 250. According to this embodiment, processor(s) 210 are adapted to initiate and process request messages to establish a unique IP address after joining home network 100 of FIG. 1, as well as to detect IP address collisions when a candidate IP address of a node that has joined home network 100 is not unique within home network 100. These messages are transmitted and received over communications interface 230, which may include one or more antennas $240_1$-$240_N$ ($N \geq 1$) that are controlled by processor 210 or dedicated circuitry (not shown) to tune and receive incoming wireless signals on a particular channel and to transmit outgoing wireless signals to other nodes over that particular channel.

Referring back to FIG. 1, prior to communicating data, tier 2 node 130 needs to associate with another node that is already part of home network 100. After an association is established, tier 2 node 130 and another tier 2 node 150 can exchange data. The association process is a two step process involving three states: (1) unauthenticated and unassociated; (2) authenticated and unassociated; and (3) authenticated and associated. To transition between the states, the communicating parties exchange messages called management frames. In operation, all nodes are adapted to transmit one or more management frames, referred to as Neighbor Discovery Request messages, to determine if there are any nodes that can decode the message and respond in a timely manner.

Before conducting operations to associate (join) home network 100, tier 2 node 130 listens for response messages to a Neighbor Discovery message in order to identify what other nodes are within range and in communication over what channel. After identifying node 132, nodes 130 and 132 may perform a mutual authentication by exchanging several management frames as part of the process. After successful authentication, tier 2 node 130 moves into the second state authenticated and unassociated. However, until a node 130 generates a unique IP address within WHMN 100, node 130 is unable to route data within WHMN 100.

Figure 3:
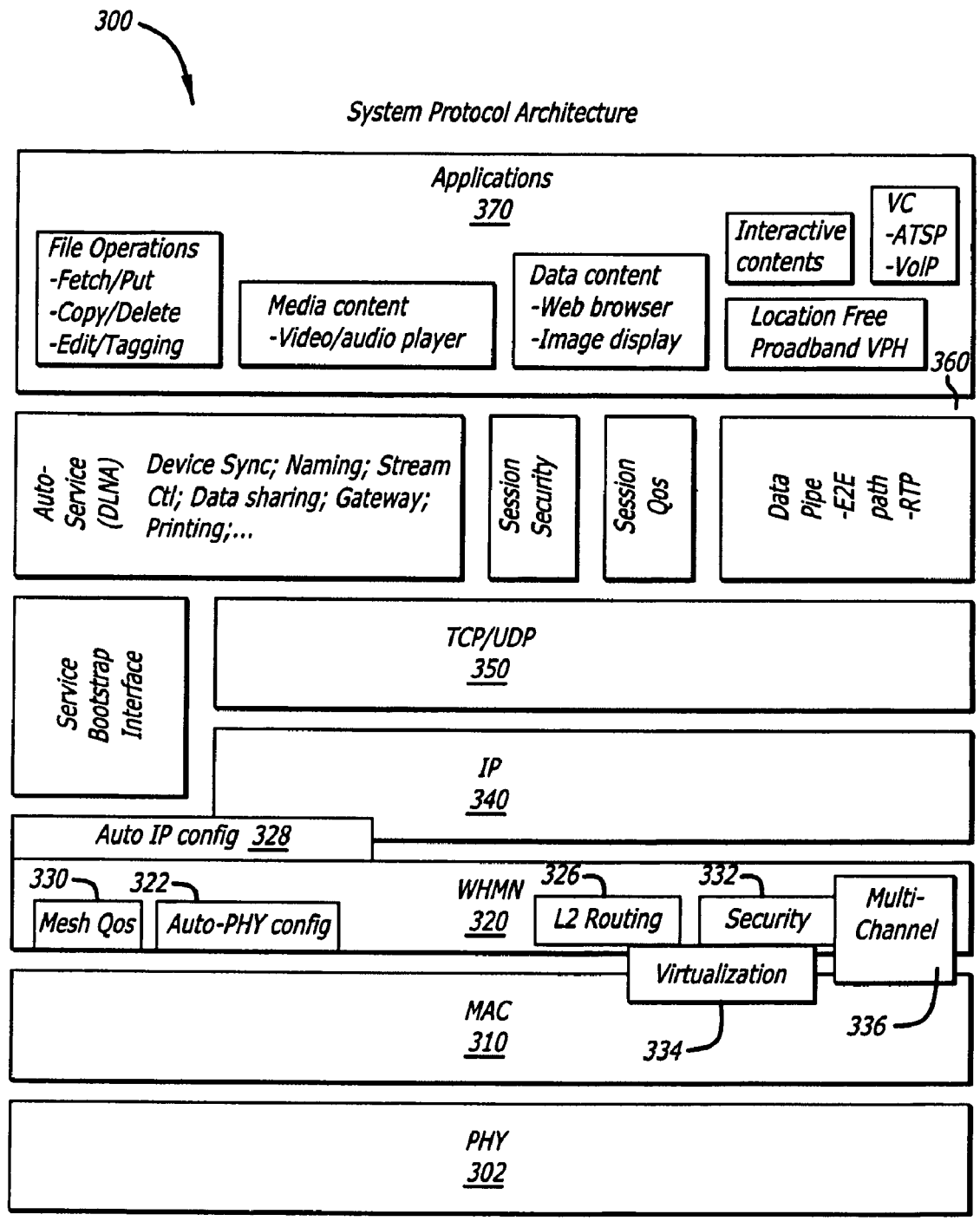
FIG. 3 is a block diagram illustrating wireless ad hoc home network protocol architecture, according to one embodiment.

Referring now to FIG. 3, a block diagram shows one embodiment of an Open Systems Interconnection (OSI) layer representation of the system protocol architecture 300 for a node within home network 100 is shown. This protocol architecture 300 is provided to achieve a self-organizing, self-configuring home network where different functions or features are designed or enhanced to current wireless network architectures built upon TCP/IP/802.11.

To enable wireless home mesh network functions, a single WiFi radio platform may be used. For example, for tier 2 nodes, one IEEE 802.11a/b/g/n, dual-band card (mini PCI, USB dongle, or the like) is used for backhaul links to operate at a 5 GHz band or higher bandwidth. In one embodiment of the invention, links connecting tier 3 nodes are compatible with legacy 802.11b/g mode simply because, at this time, most current mobile nodes support IEEE 802.11b/g WiFi. Of course, the particular wireless PHY and MAC layers may be altered accordingly.

As shown in FIG. 3, in the protocol architecture 300 described, wireless home mesh network ("WHMN") functions 320 are placed between MAC layer 310 and network IP layer 340 to provide a solution that is independent of the higher OSI layers deployed and can be more easily reconfigured. Representatively, in system protocol architecture 300 of FIG. 3, enhanced functionality is placed in WHMN layer 320 between MAC layer 310 and a Network (IP) layer 340. Hence, WHMN layer 320 generally constitutes an "OSI layer 2.5" solution. The placement of WHMN layer 320 provides enhanced functionality that is transparent to both lower and higher OSI layers, and different radio chipsets can be supported. WHMN layer 320 carries key functions for network configuration, including distributed IP address assignment and collision detection as described below.

In one embodiment, WHMN functions layer 320 is transparent to both lower and higher layers, to enable support for different radio chipsets. The WHMN layer 320 can perform functions of WHMN software organization and configuration such as auto-PHY (network discovery) configuration 322, layer 2 routings 326, auto-IP configuration 328, etc. In one embodiment, each node uses a MAC packet and MAC address for initial topology setup.

As shown in FIG. 3, WHMN layer 320 includes various smart network functions (322-336), according to one embodiment. These smart network functions are placed between (and may overlap with) MAC layer and IP layers 310 and 340. In one embodiment, the auto-IP configuration function 328 may provide automated IP address generation once an electronic device has joined an identified WHMN. In one embodiment, electronics devices, as referred to herein, describe electronic devices that include a radio NIC from an original equipment manufacturer (OEM). Some sample OEM electronic devices may include Sony® BRAVIA® digital televisions, Sony® Playstation 3® game consoles, Sony® VAIO® computers, or other like Sony® stationary and handheld devices such as smart devices.

Figure 4:
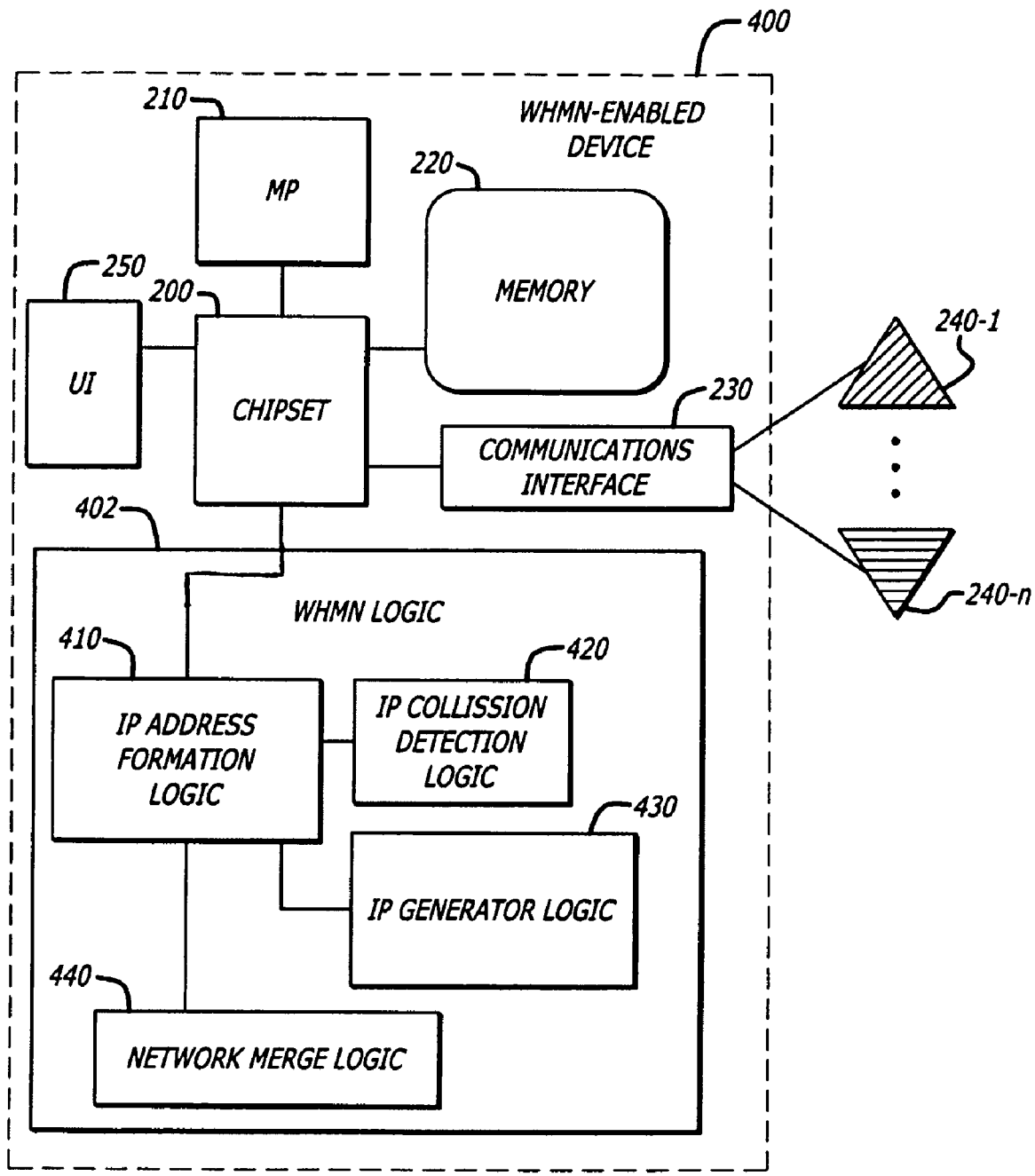
FIG. 4 is a block diagram illustrating a wireless home electronics device configured to implement a wireless home mesh network (WHMN), according to one embodiment.

In one embodiment, auto-IP configuration 328 may provide features for automated IP address generation and maintaining the uniqueness of the IP addresses by the nodes of a wireless home mesh network, that are incorporated into an OEM electronics device such as electronics device 400, as shown in FIG. 4.

As illustrated in FIG. 4, a wireless node that is WHMN-enabled, such as an OEM electronics device 400, includes a microprocessor 210 which uses wireless chipset 200 to access memory 212 and communications interface 230. The communications interface may include one or more (N>1) tunable antennas $240_1$-$240_N$. In contrast to conventional electronics devices, device 400 includes wireless ad hoc home network ("WHMN") logic 402. The WHMN logic 402 includes automated IP address formation logic 410. The logic 410 uses collision detection logic 420 and IP generation logic 430.

Figure 7:
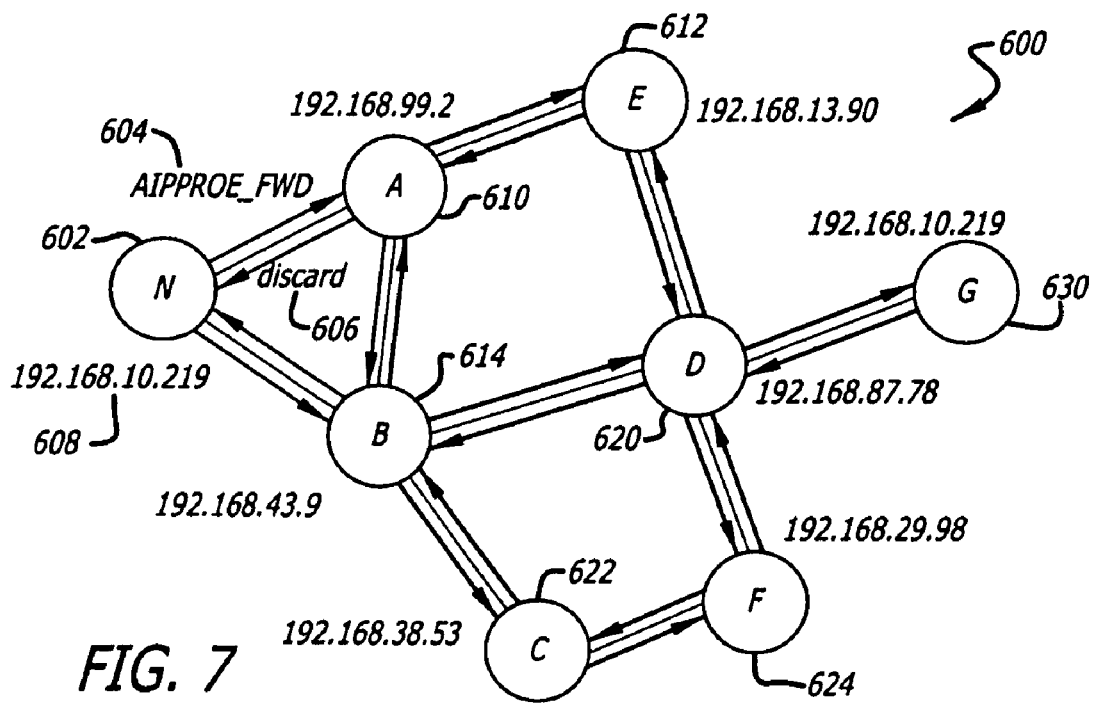
FIG. 7 is a block diagram illustrating broadcast of an AutoIP (AIP) probe message for a new node within a WHMN, according to one embodiment.
Figure 8:
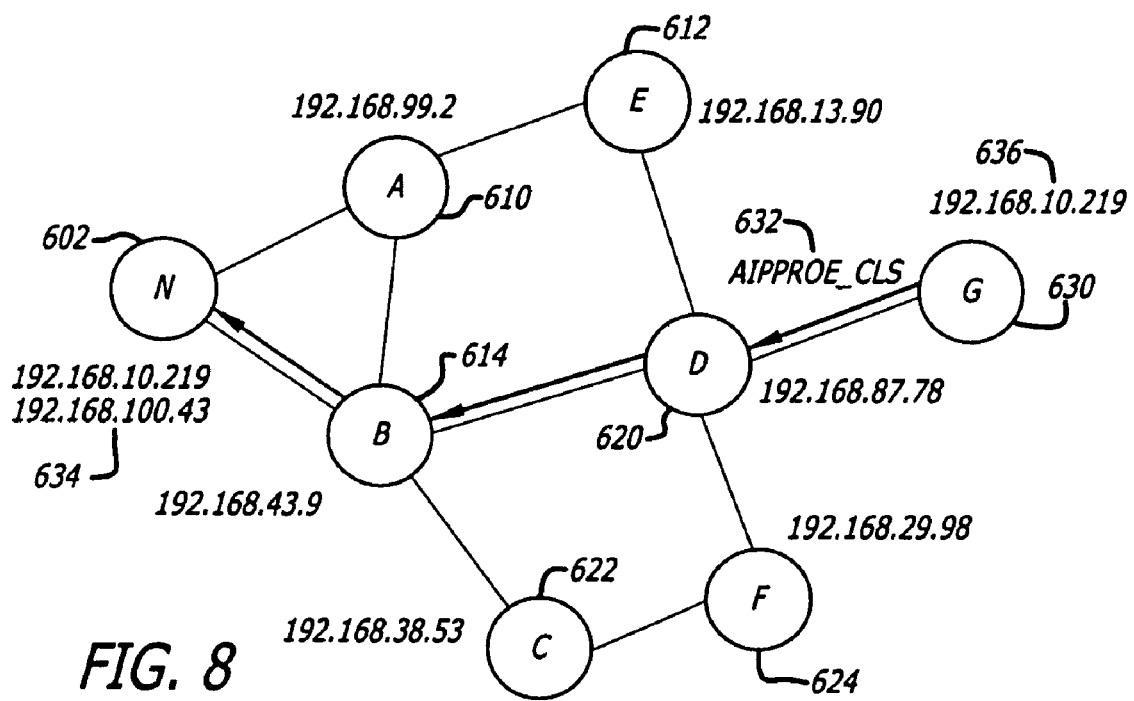
FIG. 8 is a flow chart illustrating the generation of a collision message within a WHMN, according to one embodiment.

As indicated above, the WHMN protocol stack is a cross-layer design where WHMN functions, including initial setup, routing, quality of service, and security features, are placed into OSI layers 2 and 2.5, which are below an IP layer (see FIG. 3). As a result, the WHMN protocol may solve connectivity issues in a multi-hop network that are transparent to any service applications built upon IP. In one embodiment, auto-IP configuration functionality 328 provides assignment of a unique IP address to a new node joining a WHMN, for example, as shown in FIGS. 7 and 8, as described in further detail below.

In one embodiment, since devices may join a WHMN at the same time, the likelihood of choosing the same address is reduced by providing a pseudo-random seed for generating a unique IP address within the WHMN. For example, a pseudo-random seed may use a device's hardware MAC address to distribute over the address ranges of, for example, 192.168.0.1 to 192.168.254.254. Generally, after a device chooses a candidate IP address, it broadcasts the candidate IP address to the WHMN and waits for a collision response (see FIG. 13). If a collision response is received, the candidate IP address is not unique and a new address is generated. In one embodiment, IP address generation logic performs the initial as well as new address generation in response to collision detection.

Referring again to FIG. 3, in one embodiment, IP collision detection logic 420 is responsible for responding to IP address messages issued by a new node within a WHMN. In addition, if a device receives a request with the same IP address as its own IP address, the device will unicast a collision response message to the sender, as performed by IP collision detection logic 420.

In one embodiment, when wireless node 400 is powered on, WHMN logic 402 may scan each channel to detect the presence of other networks. For example, activation of wireless node 400 may trigger the WHMN logic 402 to issue one or more 802.11 ad hoc functions to scan each wireless channel to determine a list of available wireless networks. Based on the detected beacons, logic 402 may identify one or more wireless networks that are operating in an ad hoc mode. The WHMN logic 402 may transmit one or more security parameters to enable a node within a WHMN to verify the electronics device 400 as an electronics device from a same OEM. However, a WHMN-enable device may also be a node of a WHMN, as described herein.

For example, referring again to FIG. 1, digital television (DTV) 130 may initially become a first stationary node for home network 100 of FIG. 1. According to such an embodiment, DTV 130 will include a radio NIC which will periodically emit a beacon to enable identification of home network 100 by any newly-added consumer electronics devices. For example, desktop computer 150, upon activation, may detect the presence of home network 100 based on a response received from DTV 130 in response to a connection request message. In one embodiment, the various messages used for discovery, authentication, IP address generation, and collision detection are organized based on a proprietary format as shown in FIG. 5.

Figure 5:
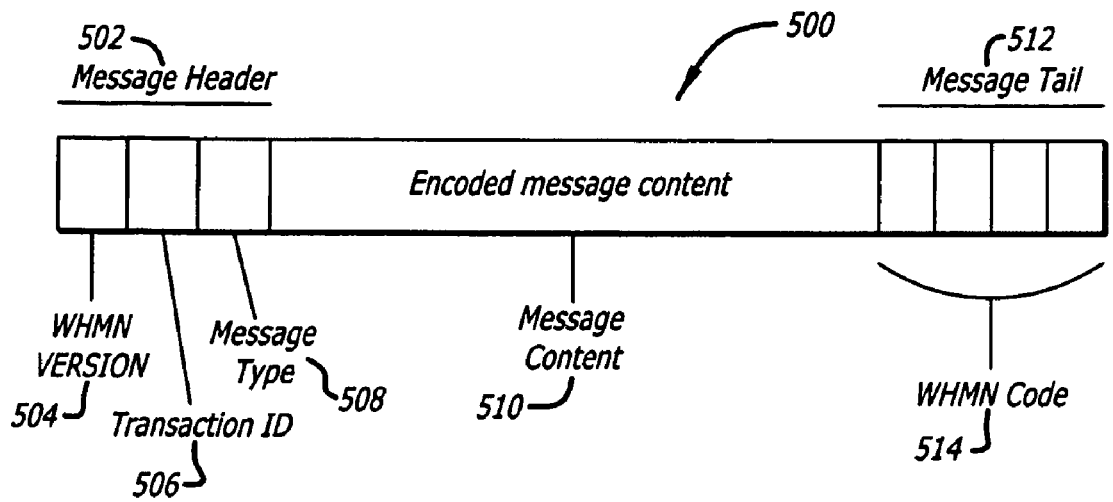
FIG. 5 illustrates a generic WHMN message packet format according to one embodiment.

FIG. 5 illustrates an exemplary format of a WHMN message 500 which is representative of a messaging format that node 400 of FIG. 4 uses for initial WHMN setup such as Auto IP propagation and collision detection. For example, during the auto-ip phase, a node would exchange several control messages to detect and correct an IP address collision. Another example, could be the one during a discovery phase where nodes analyze their wireless environment, each new wireless node may run a discovery scan to all wireless networks detected in its neighborhood. The new node then transmits a Discovery message (as a broadcast or multicast) to all identified wireless ad hoc networks to identify a WHMN in its neighborhood. Existing nodes of a WHMN respond to the Discovery message with appropriate details necessary to establish a new connection. The device discovery and a WHMN authentication process are further described in co-pending application Ser. No. 12/360,771.

More specifically, as shown in FIG. 5 as an illustrative embodiment, WHMN message 500 may include (i) a message header 502, (ii) message content 510, and (iii) a message tail 512. Herein, according to this exemplary embodiment, message header 502 includes a WHMN version 504, a transaction (message) ID 506 that identifies the particular message, a type parameter 508 indicates a type of node transmitting the message (e.g., tier 1, tier 2 or tier 3). Message content 510 may include encoded data that is used to protect the data from interlopers and to ensure that the data is accessible only by the targeted wireless node. Message tail 512 includes a WHMN code 514. In one embodiment of the invention, each WHMN message ends with a repeated WHMN code 514 that may be repeated a predetermined number of times to ensure that an entire message is received without error.

Figure 6:
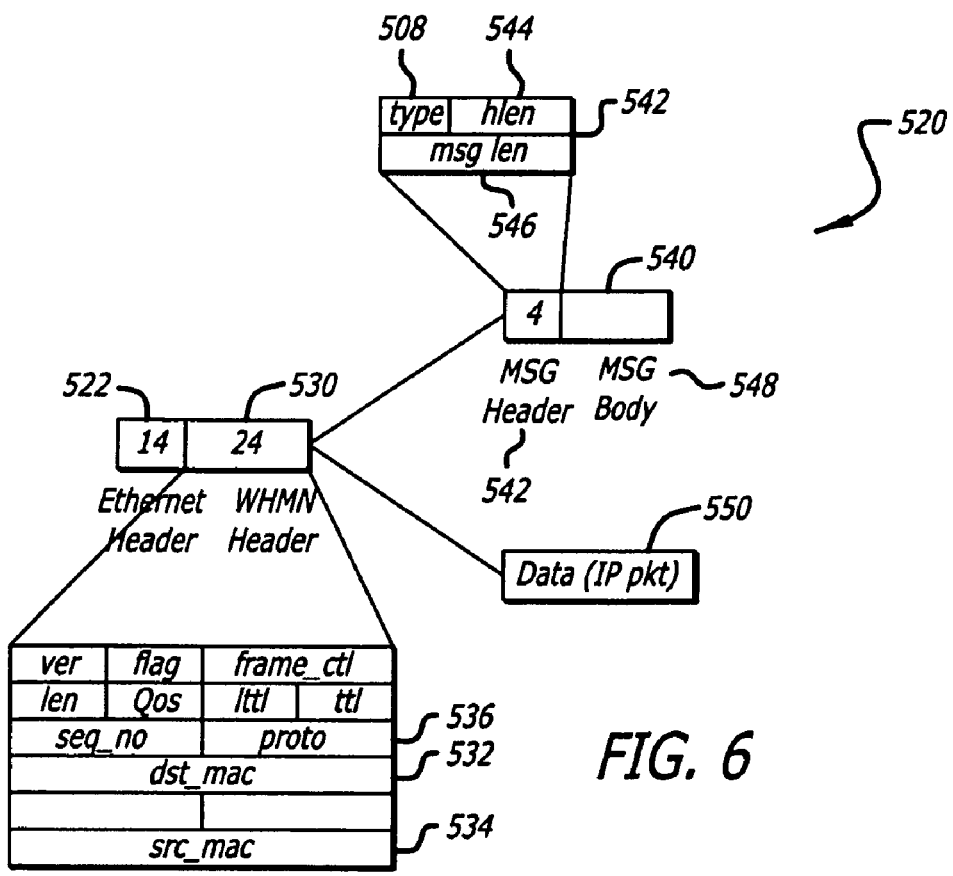
FIG. 6 illustrates an Ethernet packet including a WHMN message packet format according to one embodiment.

As an example, FIG. 6 illustrates an exemplary format of two types of WHMN message 500, namely WHMN data message 550 and WHMN control message 540. Herein, according to this embodiment, both WHMN data message 550 and WHMN control message 540 are routed by encapsulating these messages within an Ethernet packet 520. For example, as shown in FIG. 6, Ethernet packet 520 includes a 24-byte WHMN header 530 that is inserted after an Ethernet header 522. WHMN header 530 includes a destination MAC address 532 to identify a destination for WHMN message 500 and a source MAC address 534 to identify a source of WHMN message 500. Other information 536 also may be placed within header 530 including, but not limited to, a protocol version that identifies a version of the system protocol architecture, a control flag, a frame type as being data or control, a frame length, a QoS feature, a Time-to Live (TTL) value that specifies how long (in hops) the message is allowed to "live" on the network where each hop causes the TTL value to be reduced by one, a sequence number that indicates the sequence of the frame within a complete message transaction, and a data protocol type.

For control messages (e.g. discovery, authentication, routing), 4-byte control header 542 is inserted after header 530, where control header 542 includes type 508, header length 544, and message length 546. After control header 542, a message body (content) 548 of WHMN control message 540 is inserted. For Discovery messages, for instance, content 548 is a challenge text as described below.

For WHMN data messages 550, however, an IP data packet received from the OSI network layer is attached to Ethernet packet 520 after WHMN header 530 in lieu of control header 542 and content 548 to form a WHMN data message 550.

FIG. 7 illustrates one embodiment of an AutoIP (AIP) probe message (AIPPROBE_FWD) 604 generated by a new node 602 within a WHMN 600 according to one embodiment. FIG. 7 illustrates one embodiment for generating a unique IP address 608 in a distributed manner for multi-hop WHMN 600. According to the WHMN described, such networks may include fixed-location and mobile nodes that are subject to frequent link "up and down" due to node mobility or node failure. Lack of adequate means for generating a distributed IP address assignment may result in address collision detection.

Referring again to FIG. 7, when a new node 602 joins network 600, node 602 broadcasts a request message (AIPPROBE_FWD) 604 with its candidate IP address to all nodes within WHMN 600 to determine if there is an IP address collision between the candidate IP address and the IP address of an existing node. If a collision occurs, the receiving node with the same address may unicast a reply message (AIPPROBE_CLS) 604 to the sender (new node 602). In response, node 602 (sender) regenerates an IP address and goes over the same process. In WHMN, all the probe messages such as AIPPROBE_FWD and AIPPROBE_CLS are automatically forwarded between individual nodes so that the probe messages can reach all the nodes in the WHMN.

FIG. 8 further illustrates WHMN 600 and IP address regeneration 634 in response to a received AIP probe collision message 632, according to one embodiment. Representatively, Node N 602 is a newly-joined node of WHMN 600. After initially generating IP address (for example, 192.168.10.219) 608, Node N 602 broadcasts this IP address in a message 604 to all nodes (610-630). After each node receives message 604, each node may retrieve a candidate IP address from message 604. As described herein, a candidate IP address refers to an initial address generated by a new node within a WHMN. In addition, the candidate IP address may be re-generated, when a collision is detected, if the node was not the first node to have a matching IP address. Hence, each node, in response to message 604, may compare the candidate IP address 608 with its own IP address.

For example, as shown in FIG. 8, node 630 has a matching IP address 636 to the candidate IP address 608 of node 602. Representatively, node 630 detects an IP address collision and, in response to detection of the IP address collision, broadcasts an AIP probe collision message 632 to the sender (node 602). In response to receipt of collision message 632, node 602 may regenerate a candidate IP address 634 as, for example, 192.168.100.43. In one embodiment, node 602 rebroadcasts an AIP probe message with the new candidate IP address 634. This process may be repeated until there are no more IP address collisions within WHMN 600.

During the course of WHMN operations, nodes can split from the network and then later merge back into the network. To detect merging of the networks, nodes may periodically check a routing table to determine the status of the various paths to neighboring nodes within a WHMN. For example, a recovered path may indicate a change in status from, for example, "dirty" to "paved." In one embodiment, this functionality is performed by network merge logic 440 as shown in FIG. 4.

In one embodiment, when logic 440 detects a recovered path, one of the nodes should initiate the collision detection process. To avoid unnecessary broadcasting, an algorithm is used to select the node with the largest MAC address as the initiator, and the node with the smaller MAC address will keep silence. Thus a node will compare its own MAC address with the corresponding neighbor's MAC address. In one embodiment, the node with the larger MAC address broadcasts a probe message to nodes in the network to collect other IP address path information which may be cached locally. The probe message may be referred to as an AIP probe request message, which is a broadcast message in a controlled manner with the help of a session ID (SID), session sequence number (SSQ), and time to live (TTL).

Figure 9:
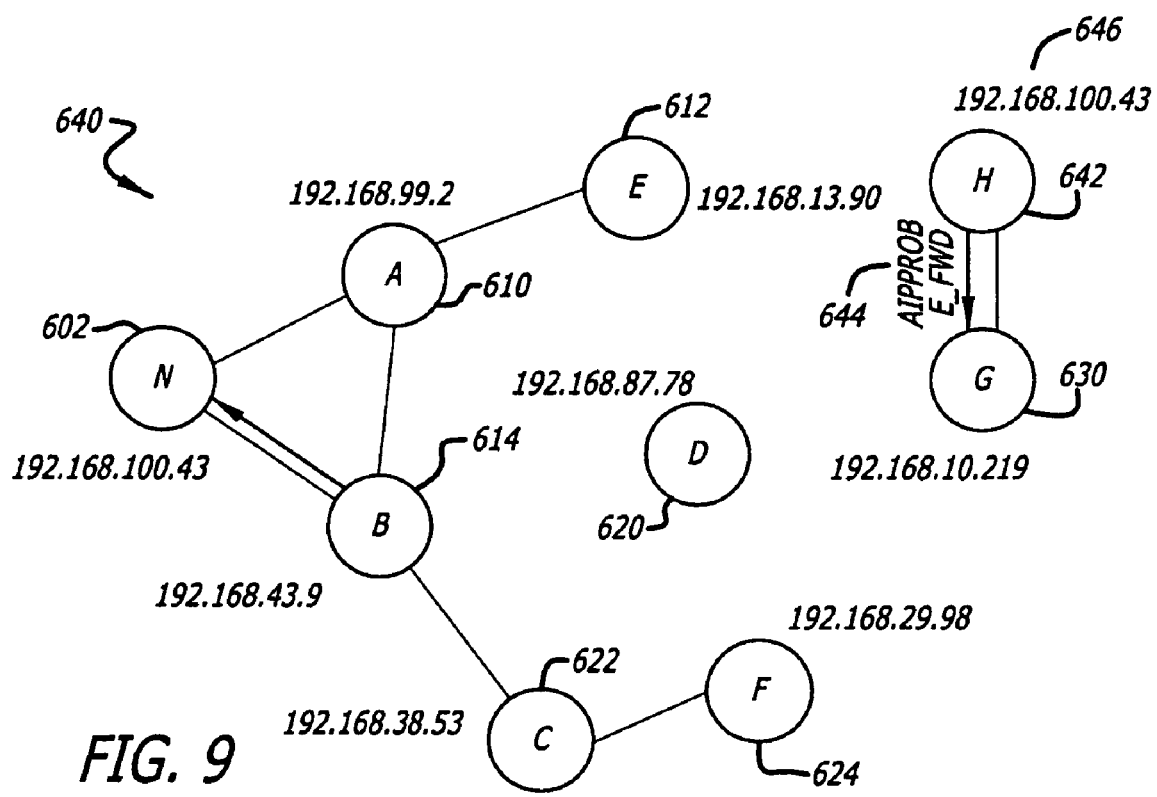
FIG. 9 is a block diagram illustrating the joining of a new node within a WHMN after a network partition, according to one embodiment.

For example, as shown in FIG. 9, WHMN 640 illustrates a new node 620 which joins WHMN 640 according to one embodiment. As compared to WHMN 600, as shown in FIGS. 7 and 8, WHMN 640 has been partitioned since node 630 is no longer a part of WHMN 600. As further shown in FIG. 9, new node 642 joins a WHMN node (G) 630. Representatively, FIG. 9 illustrates a situation where WHMN 600 is split into two networks after node 620 fails or moves out of the network. As further illustrated, node H 642 joins the network after the failure of node 620 by broadcasting AIP probe message 644 with its newly generated IP address (192.168.100.43) 646. Because new node 642 does not receive a collision message, it accepts the candidate IP address 646 as its unique IP address 646.

Figure 10:
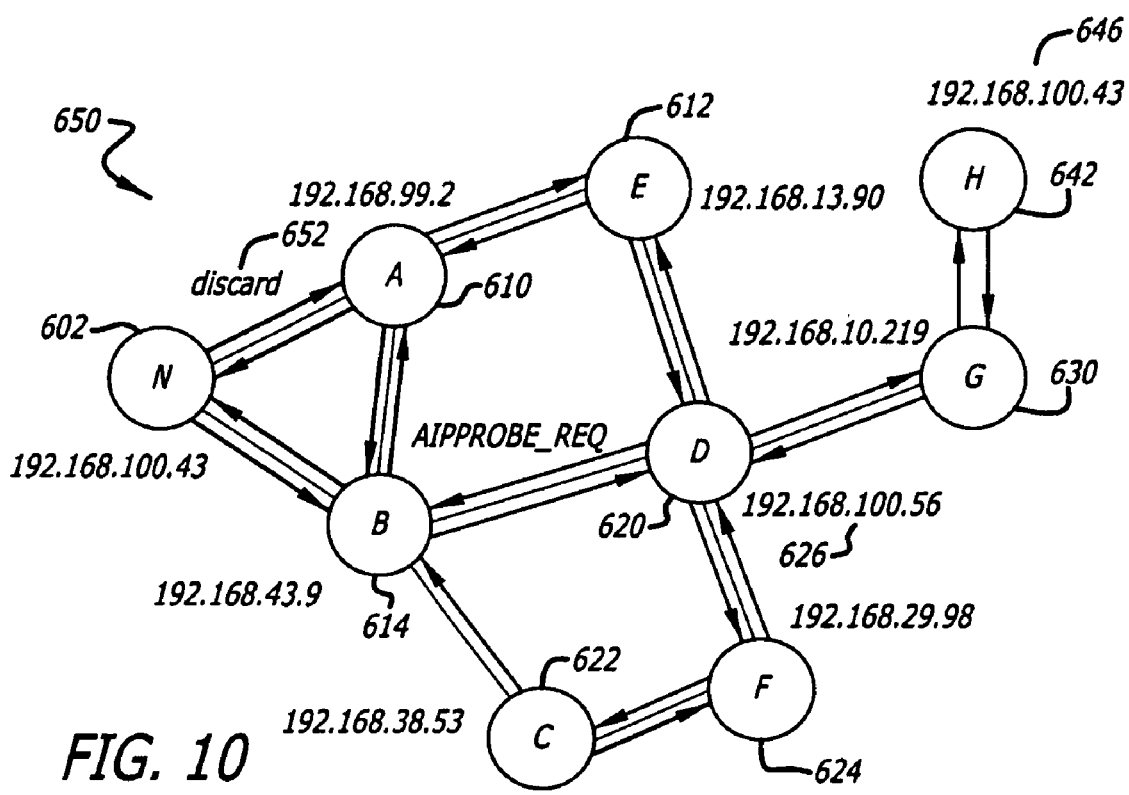
FIG. 10 is a block diagram illustrating a broadcast message sent out to collect node IP addresses when two WHMNs merge, according to one embodiment.

FIG. 10 illustrates WHMN network 650 after merging networks 600 and 640 shown in FIG. 9, with the recovery of node 620. In the example described, node 620 may detect the merging of the networks by detecting a recovery of its link with one of nodes 624, 614, or 612. After node 620 detects the merging of networks, it broadcasts an AIP probe request message (AIPPROBE_REQ) 654 with its own candidate IP address 626. In response to message 654, all other nodes will unicast back an AIPPROBE_CFM message 664 to node 620 to confirm with their own IP addresses. Node 620 will compare the received IP addresses with its own candidate IP address and each entry of its own IP cache table 662 (see FIG. 11). If no collision is detected, node 620 may store its candidate IP address into IP cache table 662. However, if node 620 detects a collision when it compares the reply messages, node 620 may send a collision message (AIPPROBE_CLS) 674 (see FIG. 12) to the nodes with IP address collisions. Those nodes which have a less IP address processing time will be forced to change their IP addresses.

Figure 11:
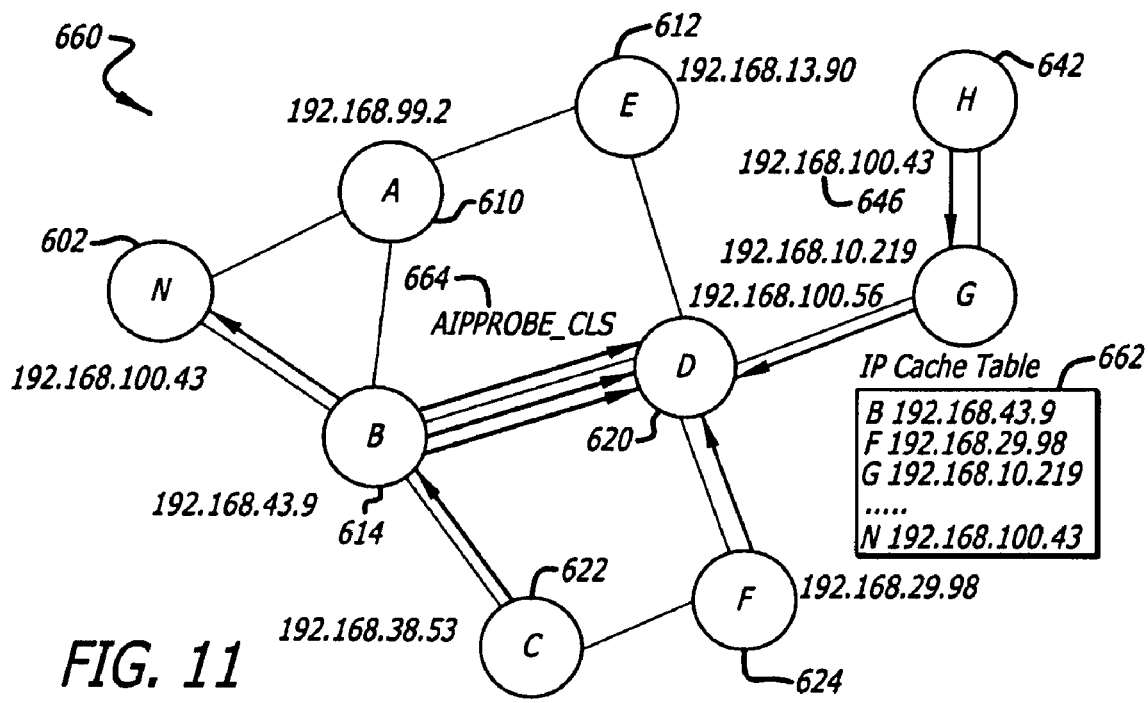
FIG. 11 is a block diagram illustrating response messages in response to a broadcast message for collection of IP addresses according to one embodiment.
Figure 12:
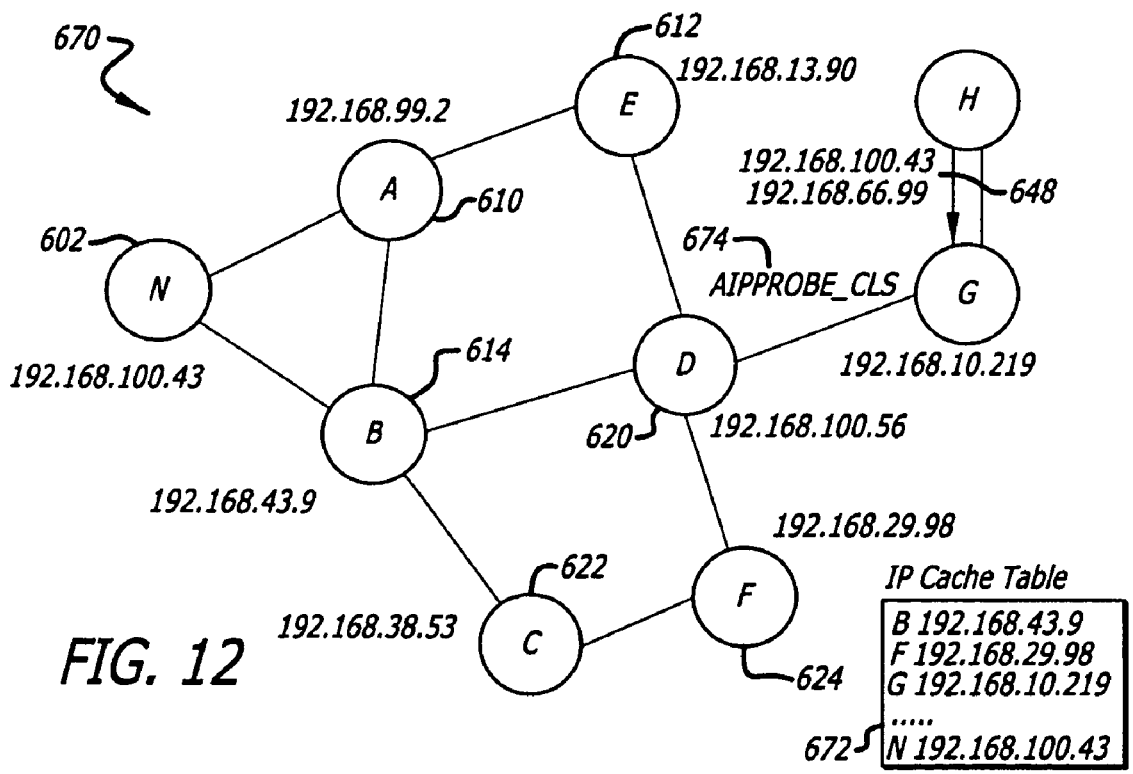
FIG. 12 is a block diagram illustrating detection of an IP address collision in a WHMN, according to one embodiment.

For example, as shown in FIGS. 11 and 12, node 620 detects a collision between an IP address of node 642 and node 602, which causes node 620 to send a collision message 674 to node 642. In response, node 642 will regenerate a candidate IP address 648 after receiving the collision message 674 from node 620, as shown in FIG. 12.

Figure 13:
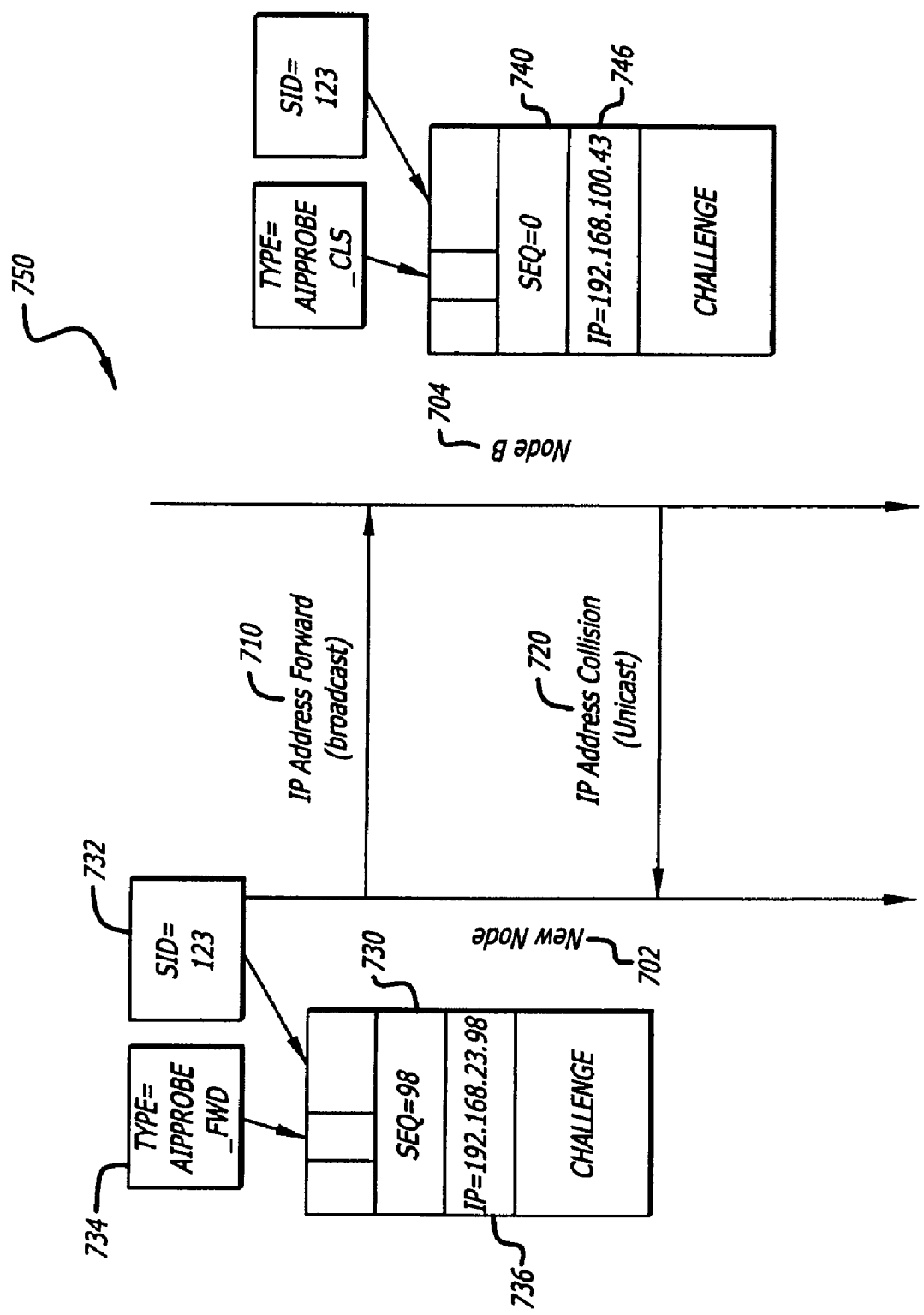
FIG. 13 illustrates a message flow process, performed by a node of a WHMN to establish a unique IP address within a WHMN, according to one embodiment.

FIG. 13 is a message flow diagram performed by a new node as part of an automated IP address generation, for example, as performed by IP generation logic 430 as shown in FIG. 4. Representatively, a new node 702 may broadcast a candidate IP address 736 using a broadcast message (AIP-PROBE_FWD) 730. As shown in FIG. 13, arrow 710 illustrates the broadcast of a candidate IP address using message 730. As further shown in FIG. 13, an established node 704 detects a match between candidate IP address 736 and IP address 746 of node 704. In response to the collision, established node 704 may broadcast an IP address collision message (AIPPROBE_CLS) 740, as shown by arrow 720.

Figure 14:
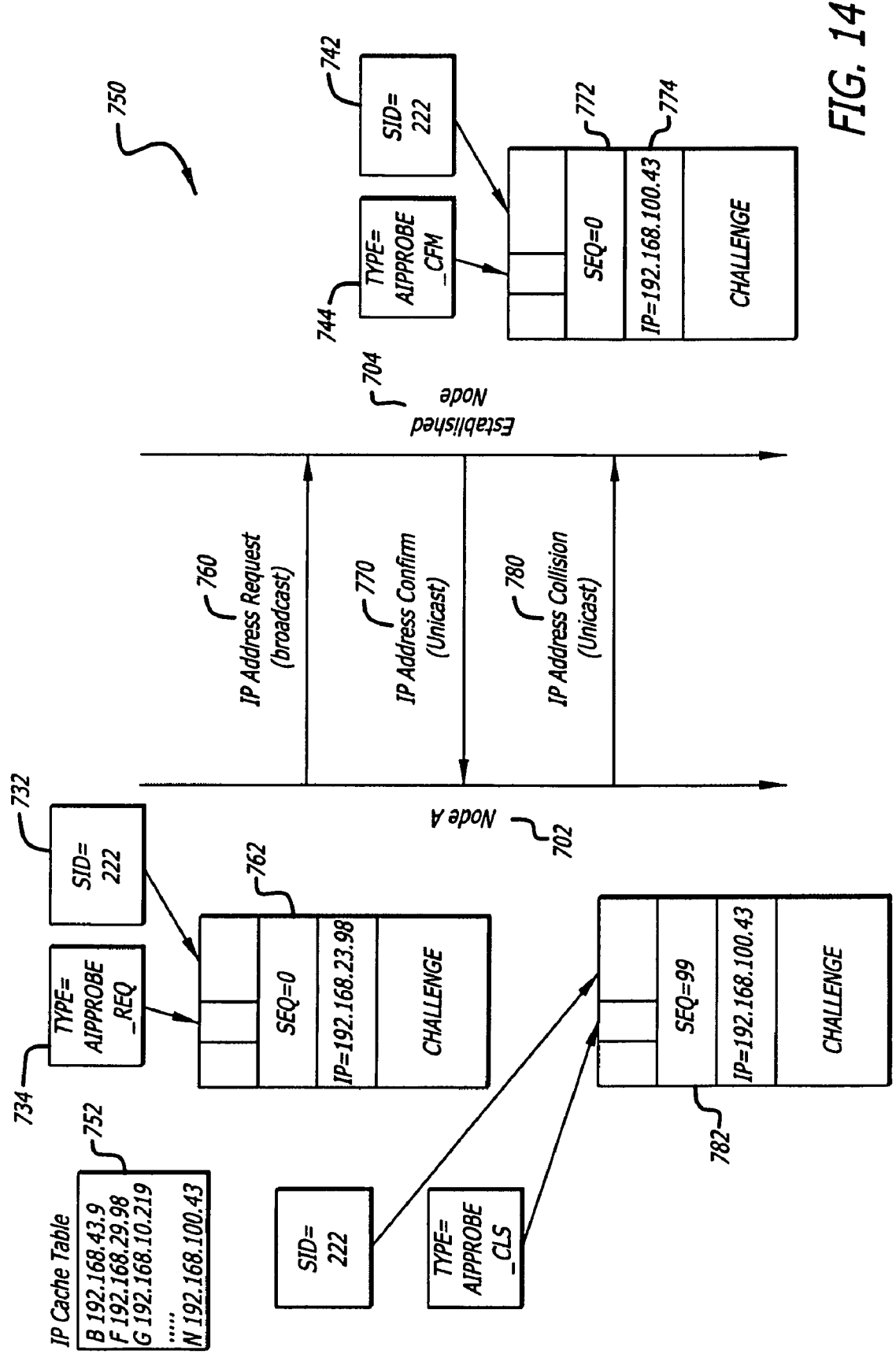
FIG. 14 illustrates a message flow process performed by a node of a WHMN to resolve a detected IP address collision, according to one embodiment.

FIG. 14 illustrates a message flow diagram 750 that may be performed between a new node (Node A) 702 and an existing node (Node B) 704 in response to link recovery, according to one embodiment. Representatively, Node A 702 may detect link recovery. In response to detection of link recovery, Node A 702 may issue an IP address request message 762 as shown by arrow 760. In response to message 762, Node B 704 may respond with an IP address confirmation message 772 that includes an IP address of Node B 704. In one embodiment, link recovery is determined by Node A 702 according to IP cache table 752 which will generally indicate a status of the various links to which Node B 704 is connected. Representatively, Node A 702 detects a collision according to IP address 774 and issues a collision message (AIP-PROBE_CLS) 782 as indicated by arrow 780. Procedural methods for implementing one or more embodiments are now described.

Operation

Figure 15:
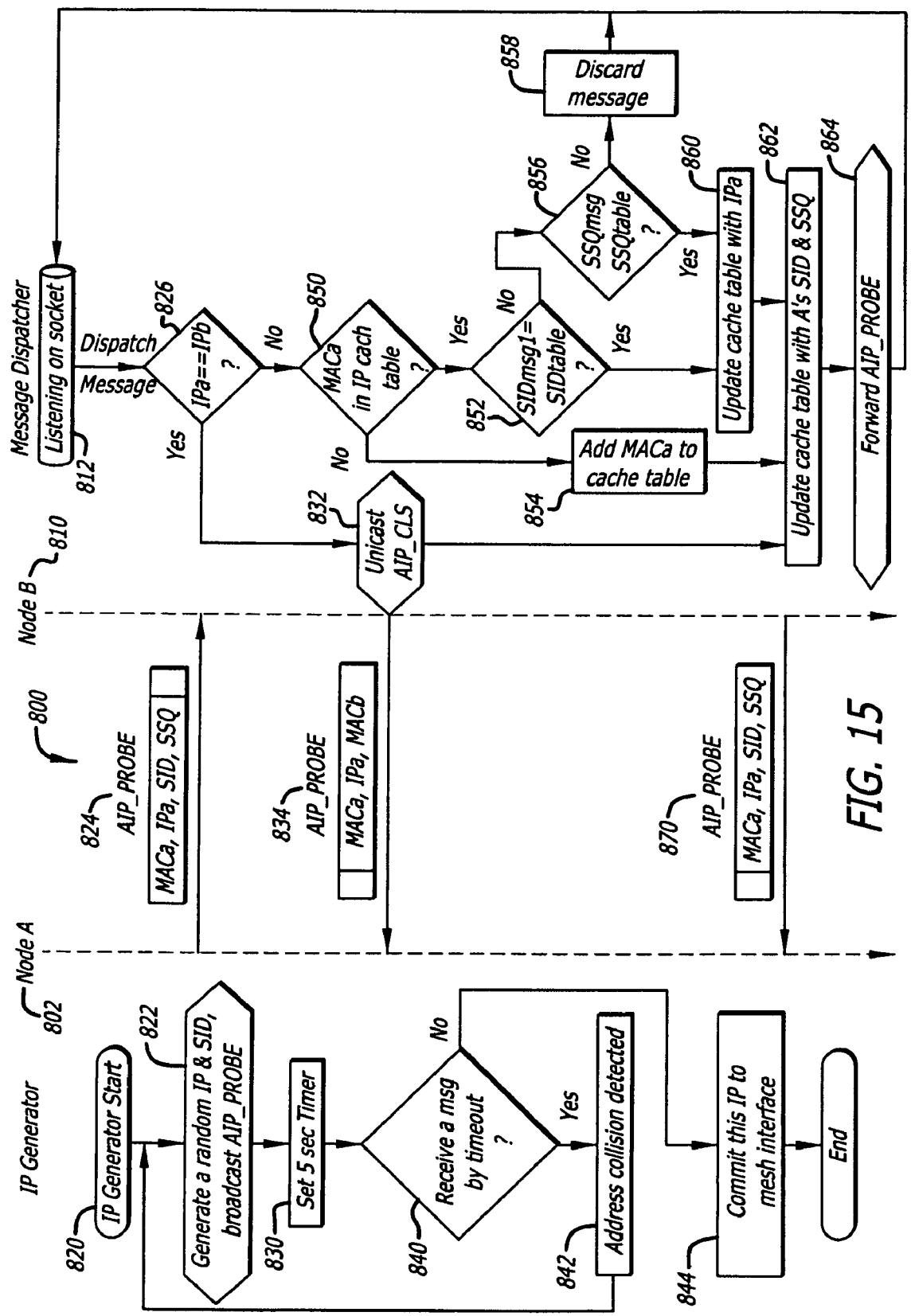
FIG. 15 is a flow chart illustrating a method for generating IP address within a multi-tier WHMN, according to one embodiment.

FIG. 15 is a flow chart illustrating a method 800 for automated IP address generation within a multi-tier wireless home mesh network, according to one embodiment. The automated IP address generation may be performed within a wireless home mesh network (WHMN), for example, as depicted in FIG. 1, utilizing an OEM/WHMN-enabled electronics device as described in FIG. 4, in accordance with one embodiment.

As shown in FIG. 15, a new node 802 performs an automated IP address generation beginning at IP generator start block 820. Representatively, node 802 will generate a candidate IP address based on one or more random seed values as described above. Node 802 may place the candidate IP address, as well as an ESSID, within an IP broadcast message (AIP_PROBE) 824, which is broadcast at process block 822. Subsequent to broadcast of message 824, node 802 may set a timer at process block 830 and at process block 840 to determine if a message response is received by a predetermined timeout period.

In response to the AIP probe message 824, node 810 may listen on a socket at process block 812. At process block 826, in response to a detected AIP probe message 824, at process block 826, node 810 may compare a candidate IP address with an IP address of node 810. If a match is detected at process block 822, node 840 may broadcast a collision message 834 to node 802. However, if a collision is not detected, at process block 850 node 810 may store a MAC address of node 802 in an IP cache table at process block 854. However, if a MAC address of node 802 is stored in the IP cache table, an ESSID of the message may be compared to an ESSID of the table at process block 852. If the values are equal and the message sequence number is greater than the cached sequence number in the sequence table, the cache table is updated with the IP address and new sequence number of node 802 at process block 860. Otherwise, at process block 858, the message is discarded. At process block 862, the cache table is updated with node 802's ESSID and its SSQ. Finally, at process block 864, an AIP probe message may be forward to node 802.

Referring again to FIG. 15, if a message is received within a timeout period, an address collision is detected at process block 842 and process blocks 820-830 may be repeated until a collision is not detected. When a collision is not detected, node 802 may commit this IP address to a mesh interface at process block 844.

Figure 16A:
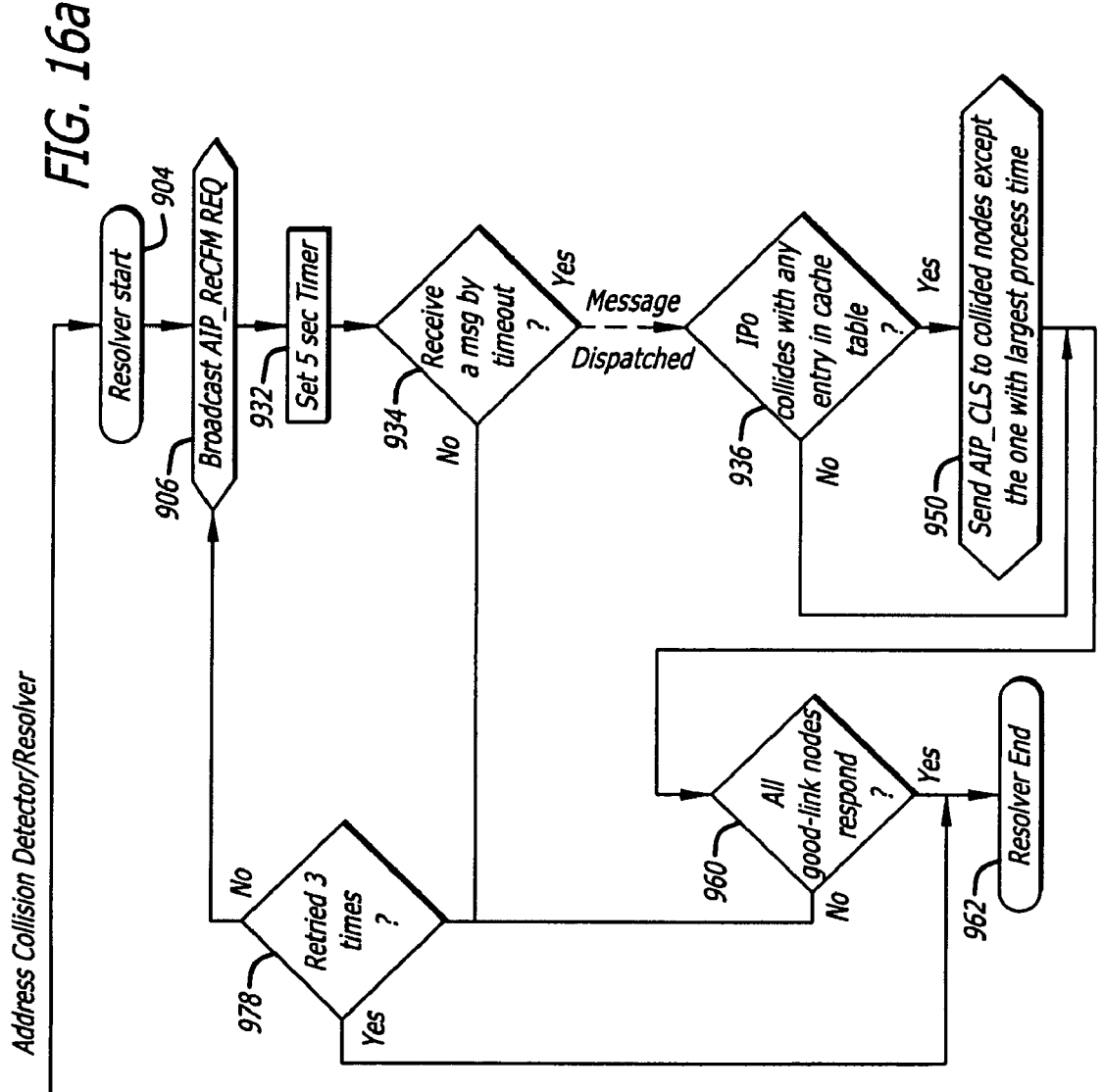
FIGS. 16A and 16B are flow charts illustrating a method for IP collision detection and resolution as performed by the nodes of a WHMN, according to one embodiment.
Figure 16A:
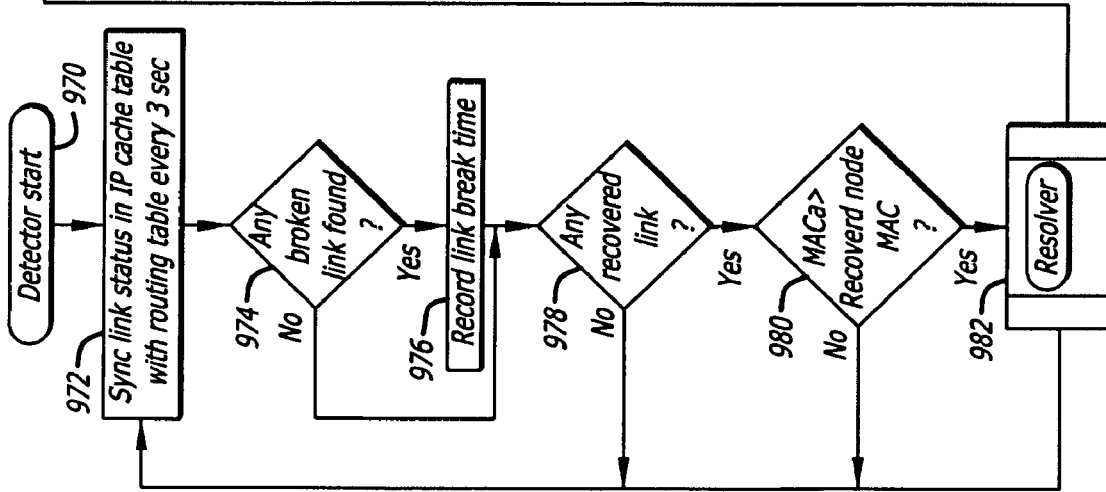
Figure 16B:
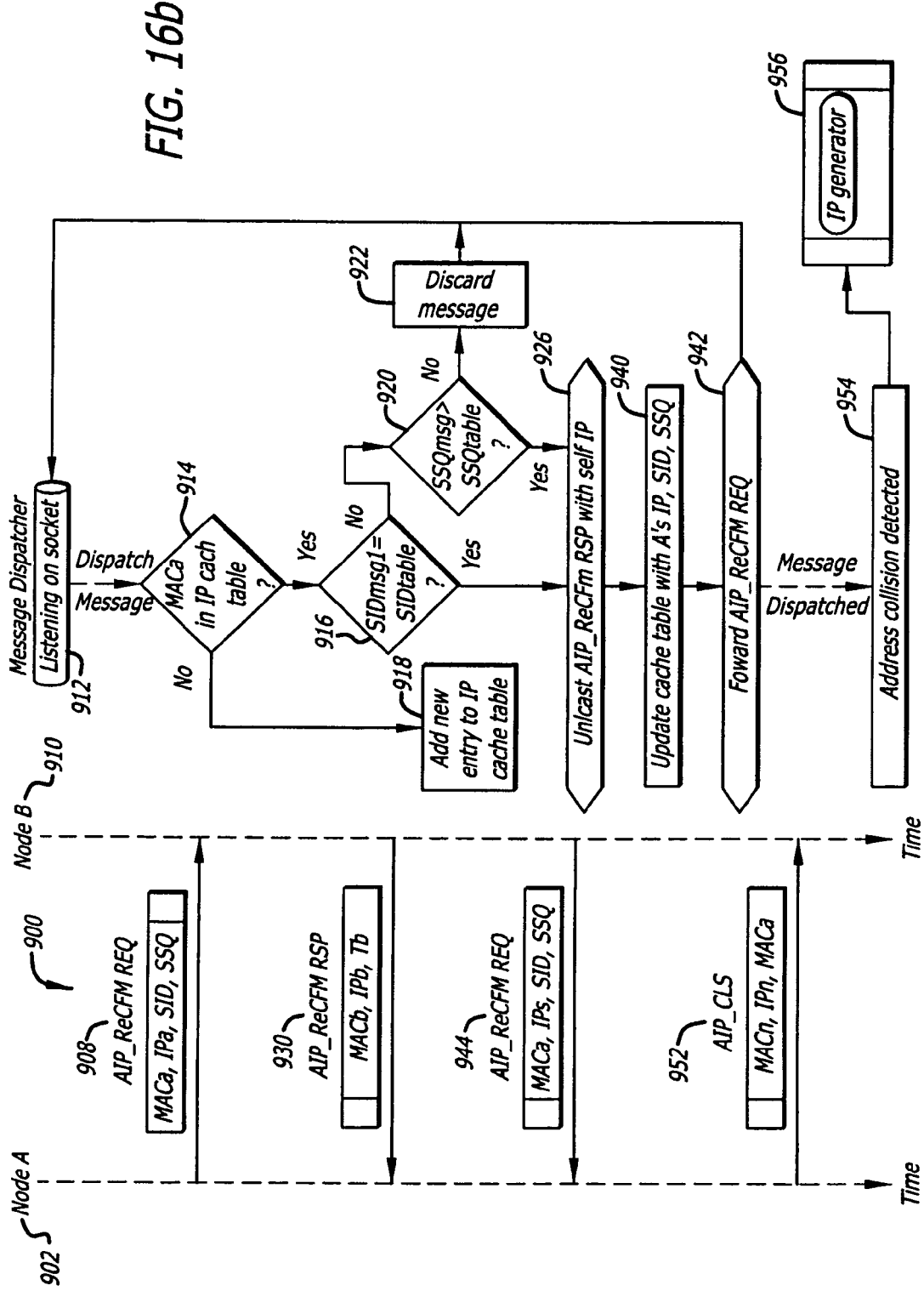

FIGS. 16A and 16B are flow charts illustrating a method 900 for IP collision detection and resolution to provide automated IP generation within a wireless home mesh network according to one embodiment. During the course of WHMN operation, nodes can split from a network and then later merge back. To detect the merging of networks, a node will periodically check a routing table to see if a route path to a neighbor has changed from broken to recovered (from "dirty" to "paved").

For example, as shown in FIG. 16A at process block 970, the detector start block is followed by synchronization of link status in an IP cache table. Based on such synchronization at process block 974, it is determined whether any broken links are detected. When a broken link is detected, a record is generated at process block 976. At process block 978 it is determined whether any link is recovered. If a link is recovered, at process block 980, it is determined whether a MAC address of a collision detector node 902 is greater than a MAC address of the recovered node. When such is detected, IP address collision resolution is initiated at process block 982, with control flow going to resolve or start block 904.

Representatively, at process block 906, a message is broadcast to each node to collect other IP address information from each of the nodes, which is cached locally. At process blocks 932 and 934, it is determined whether a message is received by a timeout period, which may be retried at process block 935.

Referring now to FIG. 16B, in response to AIP probe message 908, at process block 912, node 910 may listen on a socket in response to the message 908 to determine whether a MAC address of node 902 is contained within a cache table. If the MAC address is not contained within the cache table, at process block 918 the address may be added to the cache table as a new entry. Otherwise, the comparison of ESSIDs and message sequence numbers may be performed at process blocks 916 and 920 to determine whether to discard the message at process block 922. If the message is not discarded, at process block 926 a confirmation response message is unicast and an IP cache table is updated with an IP address, an ESSID, and an SSQ at process block 940. At process block 942, a confirmation request message may be forwarded to Node A.

Referring again to FIG. 16A, based on received confirmation response 930, node 908 may compare and determine whether an address of node 910 collides with an entry in a cache table at process block 936. If a collision is detected, at process block 950, node 902 may send a collision message 952. Once all good links have responded, the IP address collision is resolved successfully. Referring now to FIG. 16B, collision detection message 952 triggers an address collision at process block 954. At process block 956, IP address generation is performed to select a new candidate IP address.

Referring again to FIG. 1, the various links between tier 2 nodes, such as flat-panel TVs 130, 131, and 132, gaming console 140, and desktop computer 150 may provide a backhaul 170 of the network 100. As indicated above, this backhaul of the network may route, for example, high definition (HD) video content to provide a television-centric network. In a television-centric network where content stored, for example, on TV 130 may be routed within network 100 and displayed on any of TVs 131-132, and/or provided to desktop computer 150 or gaming console 140. Hence, regardless of the location within the WHMN 100, content may be routed to any desired tier 2 device.

Furthermore, access to external networks via tier 1 devices 110-111, such as gateway node 120, is provided. For example, a user in the back yard using laptop computer 166 may establish a link with gaming console 140 to join WHMN 100. Based on joining of the network, this user may access gateway node 120 via multi-hop path including game console 140, digital television 132, desktop computer 150, and backhaul link 170.

In addition to network extension capabilities, WHMN 100 may enable access from various tier 3 devices including handheld video recorder 162, music player 168, or the like, to stream content from such devices throughout the network. In addition, tier 3 devices (160-169) can load content within, for example, a music player 168 which is outside of WHMN 100. In the embodiments described the various tier 2 or 3 devices may be from the same OEM, such as Sony® Electronics. However, other non-OEM devices may be enabled for joining and accessing WHMN 100. Accordingly, such devices, once activated, will automatically form a wireless ad hoc network with minimal user interaction beyond selection of desired networks, creation of additional networks, or password information for network authentication.

Alternate Embodiments

Several aspects of one implementation of the wireless ad hoc home network for providing improved home electronic device connectivity are described. However, various implementations of the wireless ad hoc home network provide numerous features including, complementing, supplementing, and/or replacing the features described above. Features can be implemented as part of the access point or as part of the wireless devices in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
establishing, by an electronics device, a unique IP address within a detected wireless home mesh network to establish the electronics device as one of a mobile node and a stationary node of the wireless home mesh network, the wireless home mesh network including a plurality of nodes, the plurality of nodes includes at least one stationary home electronics device as a stationary node, wherein establishing the unique IP address is performed automatically and includes
generating a random value using a MAC address of a new node, a current time-stop, and a random seed value,
adding a default IP prefix to the random value to form a candidate IP address,
issuing a probe message that is broadcast to a wireless home mesh network, including a MAC address of the new node and the IP candidate selected by the new node, and
receiving an IP address collision message if the candidate IP value matches an IP address of a node within the wireless home mesh network; and
routing packets between the plurality of nodes of the wireless home mesh network.

2. A method comprising:
establishing, by an electronics device, a unique IP address within a detected wireless home mesh network to establish the electronics device as one of a mobile node and a stationary node of the wireless home mesh network, the wireless home mesh network including a plurality of nodes, the plurality of nodes include at least one stationary home electronics device as a stationary node, wherein establishing the unique IP address includes the electronics device:
broadcasting a candidate IP address to the wireless home mesh network,
if the candidate IP address matches an IP address of one node of the wireless home mesh network, receiving a collision message from the one node, and
regenerating the candidate IP address to obtain a regenerated candidate IP address, the regenerated candidate IP address being different from the candidate IP address, and
broadcasting the regenerated candidate IP address to the wireless home mesh network; and
routing packets between the plurality of nodes of the wireless home mesh network.

3. The method of claim 1, further comprising:
wirelessly interconnecting one or more stationary home electronics devices to form a backhaul of the wireless home mesh network; and
wirelessly exchanging high definition (HD) video content between the one or more stationary nodes of the wireless home mesh network.

4. The method of claim 1, further comprising:
establishing a wireless link with a stationary node to join the wireless home mesh network as a mobile node; and
sharing services and content with the stationary node.

5. The method of claim 2, further comprising:
joining the wireless home mesh network if a connection confirmation is received;
generating the candidate IP address according to a random seed value;
if the candidate IP address does not match an IP address of any of the plurality of nodes,
storing the candidate IP address as the unique IP address of the electronic device within the wireless home mesh network.

6. The method of claim 1, wherein an 8-bit portion of the candidate IP address is generated as a random value.

7. The method of claim 1, further comprising:
retrying issuance of the IP candidate probe message; and
establishing a candidate IP address as an address of a new node if an IP collision message is not received within a predetermined number of retries.

8. A method, comprising:
receiving, by one of a mobile node and a stationary node of a wireless home mesh network, an IP probe message from a new node of the wireless home mesh network, the IP probe message including a candidate IP address generated by the new node, the one of a mobile node and a stationary node being a first node;
if the candidate IP address matches an IP address of the first node,
sending, by the first node, a collision message to the new node if the candidate IP address matches an IP address of the first node, and
receiving, by the first node, a regenerated candidate IP address from the new node, the regenerated candidate IP address being different from the candidate IP address; and
if the candidate IP address does not match the IP address of the first node or any of the plurality of nodes included in the wireless home mesh network, confirming that the candidate IP address is unique within the wireless home mesh network, the unique candidate IP address to enable the new node to perform multi-tier packet forwarding for routing packets between mobile nodes and stationary nodes of the wireless home mesh network.

9. The method of claim 8, further comprising: accessing, by a mobile node, digital content from a stationary node of the wireless home mesh network.

10. The method of claim 8, further comprising:
receiving a request for high definition (HD) video stored within a stationary node; and
streaming the HD video via a backhaul of stationary nodes over the wireless home mesh network.

11. An apparatus comprising:
a wireless communications interface;
a controller, including network initialization logic, to establish a wireless home mesh network;
network discovery logic to enable exchange of one or more proprietary messages to join a detected wireless home mesh network as a first node being one of a mobile node and a stationary node of the wireless home mesh network; and
address generation logic to enable packet routing between mobile nodes and stationary nodes of the wireless home mesh network,
wherein the address generation logic is to establish a unique IP address within a detected wireless home mesh network to establish an electronics device as the first node,
wherein the address generation logic is to generate a new IP address for the first node if a collision response is received.

12. The apparatus of claim 11, wherein the apparatus comprises one of a mobile electronics device, a gaming console, and a digital television.

13. The apparatus of claim 11, wherein the wireless home mesh network including at least one stationary home electronics device as a stationary node.

14. The apparatus of claim 11, further comprising collision detection logic to notify a recovered node of an IP address collision if an IP address received in response to the collision detection message matches the candidate IP address.

15. The apparatus of claim 11, wherein the collision detection logic is further to issue a collision response if a received response includes a match IP address.

16. A system, comprising:
a wireless gateway coupled to a wired network to operate as a gateway node of a wireless home mesh network;
a stationary home electronics device including a wireless interface to communicate with the wireless gateway to operate as a stationary node of the wireless home mesh network; and
a mobile electronics device including a wireless interface to communicate with a stationary node to join the wireless home mesh network as a mobile node,
wherein stationary and mobile nodes of the wireless home mesh network automatically establish a unique IP address to perform multi-tier packet forwarding for routing packets between the mobile and stationary nodes of the wireless home mesh network to stream digital content within the wireless home mesh network, wherein automatically establishing a unique IP address includes:
generating a random value using a MAC address of a new node, a current time-stop, and a random seed value,
adding a default IP prefix to the random value to form a candidate IP address,
issuing a probe message that is broadcast to a wireless home mesh network, including a MAC address of the new node and the IP candidate selected by the new node, and
receiving an IP address collision message if the candidate IP value matches an IP address of a node within the wireless home mesh network.

17. The system of claim 16, wherein the stationary home electronics device is one of a digital television, a gaming console, and a desktop computer.

18. The system of claim 16, wherein one or more stationary home electronics devices wirelessly interconnect to form a backhaul of the wireless home mesh network.

19. The system of claim 16, wherein the stationary nodes further comprise:
streaming logic to wirelessly exchange high definition (HD) video content between the one or more stationary nodes of the wireless home mesh network.

20. A method, comprising:
detecting recovery of a link with a recovered node of a wireless home mesh network;
broadcasting a collision detection message according to a candidate IP address of the recovered node; and notifying the recovered node of an IP address collision if an IP address received in response to the collision detection message matches the candidate IP address; and regenerating by the recovered node a regenerated candidate IP address of the recovered node being different from the candidate IP address.

21. The method of claim 20, further comprising:

confirming that the candidate IP address or the regenerated candidate IP address is unique within the wireless home mesh network, to enable the new node to perform multi-tier packet forwarding for routing packets between mobile nodes and stationary nodes of the wireless home mesh network.

22. The method of claim 20, wherein notifying further comprises:

collecting an IP address from each node within the wireless home mesh network in response to the broadcast collision detection message;

comparing the collected IP addresses to the candidate IP address to detect a collision; and broadcasting a collision detection message to the new node if a collision is detected.

23. The method of claim 20, wherein the collision detection message is broadcast by the recovered node.

* * * * *